US012469465B2

(12) United States Patent
Jeong et al.

(10) Patent No.: US 12,469,465 B2
(45) Date of Patent: Nov. 11, 2025

(54) DISPLAY DEVICE

(71) Applicant: Samsung Display Co., LTD., Yongin-si (KR)

(72) Inventors: Keuk Jin Jeong, Yongin-si (KR); Won Gyun Kim, Yongin-si (KR); Ji Hoon Yang, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/761,503

(22) Filed: Jul. 2, 2024

(65) Prior Publication Data

US 2025/0104654 A1 Mar. 27, 2025

(30) Foreign Application Priority Data

Sep. 25, 2023 (KR) ........................ 10-2023-0127842

(51) Int. Cl.
*G09G 3/3291* (2016.01)
*G09G 3/3233* (2016.01)

(52) U.S. Cl.
CPC ....... *G09G 3/3291* (2013.01); *G09G 2310/08* (2013.01)

(58) Field of Classification Search
None
See application file for complete search history.

(56) References Cited

U.S. PATENT DOCUMENTS 8,487,843 B2 * 7/2013 Goh ..................... G09G 3/3233 345/82
2019/0073957 A1 * 3/2019 Yang .................... G09G 3/3258
2020/0279532 A1 * 9/2020 Park ..................... G09G 3/3275

FOREIGN PATENT DOCUMENTS

KR 1020230025576 A 2/2023
KR 10-2628633 1/2024

* cited by examiner

*Primary Examiner* — Sepehr Azari
(74) *Attorney, Agent, or Firm* — CANTOR COLBURN LLP

(57) ABSTRACT

A display device includes: a light emitting element; a driving voltage line transmitting a driving voltage signal having an active level or a non-active level in a preset period; a data line to which a data signal is applied; a first transistor connected between the driving voltage line and the light emitting element; and a second transistor connected to the driving voltage line and the data line, where a gate electrode of the second transistor is connected to the driving voltage line, and a source electrode of the second transistor is connected to the data line.

21 Claims, 20 Drawing Sheets

DISPLAY DEVICE

This application claims priority to Korean Patent Application No. 10-2023-0127842, filed on Sep. 25, 2023, and all the benefits accruing therefrom under 35 U.S.C. 119, the content of which in its entirety is herein incorporated by reference.

BACKGROUND

1. Field

The disclosure relates to a display device and, more particularly, to a display device capable of reducing the number of gate lines.

2. Description of the Related Art

A head mounted display (HMD) is an image display device that is worn on a user's head in the form of glasses or helmets to form a focus at a close distance in front of the user's eyes. The head mounted display may implement virtual reality (VR) or augmented reality (AR).

The head mounted display may magnify an image displayed on a small display device by using a plurality of lenses, and display the magnified image. Therefore, the display device applied to the head mounted display may be desired to provide high-resolution images, for example, images with a resolution of 3000 pixels per inch (PPI) or higher. Accordingly, an organic light emitting diode on silicon (OLEDoS), which is a high-resolution small organic light emitting display device, may be used as the display device applied to the head mounted display. The OLEDOS is an image display device in which an organic light emitting diode (OLED) is disposed on a semiconductor wafer substrate on which a complementary metal oxide semiconductor (CMOS) is disposed.

SUMMARY

Embodiments of the disclosure provide a display device capable of reducing the number of gate lines.

According to an embodiment of the disclosure, a display device includes: a light emitting element; a driving voltage line which transmits a driving voltage signal having an active level or a non-active level in a preset period; a data line to which a data signal is applied; a first transistor connected between the driving voltage line and the light emitting element; and a second transistor connected to the driving voltage line and the data line, where a gate electrode of the second transistor is connected to the driving voltage line, and a source electrode of the second transistor is connected to the data line.

In an embodiment, a gate electrode of the first transistor may be connected to a first node, a source electrode of the first transistor may be connected to the driving voltage line, and a drain electrode of the first transistor may be connected to a first electrode of the light emitting element through a third node, and a second electrode of the second transistor may be connected to a second node.

In an embodiment, the display device may further include: a third transistor including a gate electrode connected to a second gate line to which a second gate signal is applied, a source electrode connected to the third node, and a drain electrode connected to the first node; a fourth transistor including a gate electrode connected to a first gate line to which a first gate signal is applied, a source electrode connected to the first node, and a drain electrode connected to an initialization voltage line; a fifth transistor including a gate electrode connected to an emission control line to which an emission control signal is applied, a source electrode connected to the third node, and a drain electrode connected to the first electrode of the light emitting element; a first capacitor connected between the first node and the second node; and a second capacitor connected between the initialization voltage line and the second node.

In an embodiment, the preset period may include an initialization period, a threshold voltage detection period, a data write period, and an emission period.

In an embodiment, in the initialization period, each of the driving voltage signal and the first gate signal may have an active level, each of the second gate signal and the emission control signal has a non-active level, and the data signal may have a level of a reference voltage.

In an embodiment, the driving voltage signal of the active level, the first gate signal of the active level, the second gate signal of the active level, and the emission control signal of the active level may have a same magnitude as each other.

In an embodiment, the driving voltage signal of the non-active level, the first gate signal of the non-active level, the second gate signal of the non-active level, and the emission control signal of the non-active level may have a same magnitude as each other.

In an embodiment, the display device may further include a common voltage line connected to the second electrode of the light emitting element, where the common voltage line may transmit a common voltage.

In an embodiment, the reference voltage may be higher than the driving voltage signal of the non-active level and lower than the common voltage.

In an embodiment, the initialization voltage line may transmit an initialization voltage, and the initialization voltage may be lower than or equal to the common voltage.

In an embodiment, each of the driving voltage signal of the active level, the first gate signal of the active level, the second gate signal of the active level, and the emission control signal of the active level may be a negative voltage, and each of the driving voltage signal of the non-active level, the first gate signal of the non-active level, the second gate signal of the non-active level, and the emission control signal of the non-active level may be a positive voltage.

In an embodiment, in the threshold voltage detection period, the second gate signal has an active level, each of the driving voltage signal, the first gate signal, and the emission control signal has a non-active level, and the data signal may have a level of a reference voltage.

In an embodiment, in the data write period, the driving voltage signal has an active level, each of the first gate signal, the second gate signal, and the emission control signal has a non-active level, and the data signal may have a level of a data voltage.

In an embodiment, in the emission period, the emission control signal has an active level, each of the driving voltage signal, the first gate signal, and the second gate signal has a non-active level, and the data signal may have a level of a reference voltage.

In an embodiment, the first capacitor and the second capacitor may have a same capacitance as each other.

In an embodiment, each of the first to fifth transistors may be a P-type metal-oxide-semiconductor field effect transistor (MOSFET).

In an embodiment, the driving voltage signal of the active level may have a magnitude less than a magnitude of the driving voltage signal of the non-active level.

In an embodiment, the driving voltage signal of the active level may be a positive voltage, and the driving voltage signal of the non-active level is a negative voltage.

In an embodiment, the driving voltage signal of the active level may have a magnitude corresponding to a turn-on voltage of the second transistor.

In an embodiment, the driving voltage signal of the non-active level may have a magnitude corresponding to a turn-off voltage of the second transistor.

In an embodiment, the display device may further include: a third transistor including a gate electrode connected to a second gate line to which a second gate signal is applied, a source electrode connected to the third node, and a drain electrode connected to the first node; a fourth transistor including a gate electrode connected to a first gate line to which a first gate signal is applied, a source electrode connected to the first node, and a drain electrode connected to a common voltage line; a fifth transistor including a gate electrode connected to an emission control line to which an emission control signal is applied, a source electrode connected to the third node, and a drain electrode connected to the first electrode of the light emitting element; a first capacitor connected between the first node and the second node; and a second capacitor connected between the common voltage line and the second node.

In accordance with embodiments of the display device according to the disclosure, a driving voltage signal may be applied in an alternating current manner. Accordingly, turn-on and turn-off of a transistor can be controlled by the driving voltage signal. Therefore, the number of gate lines for controlling turn-on and turn-off of the transistor can be reduced.

In such embodiments, since a threshold voltage detection period and a data write period are separated from each other, the data voltage may be written at high speed. Therefore, high-speed driving of the display device may be possible.

BRIEF DESCRIPTION OF THE DRAWINGS

The above and other features of embodiments of the disclosure will become more apparent by describing in detail embodiments thereof with reference to the attached drawings, in which.

DETAILED DESCRIPTION

Figure 1:
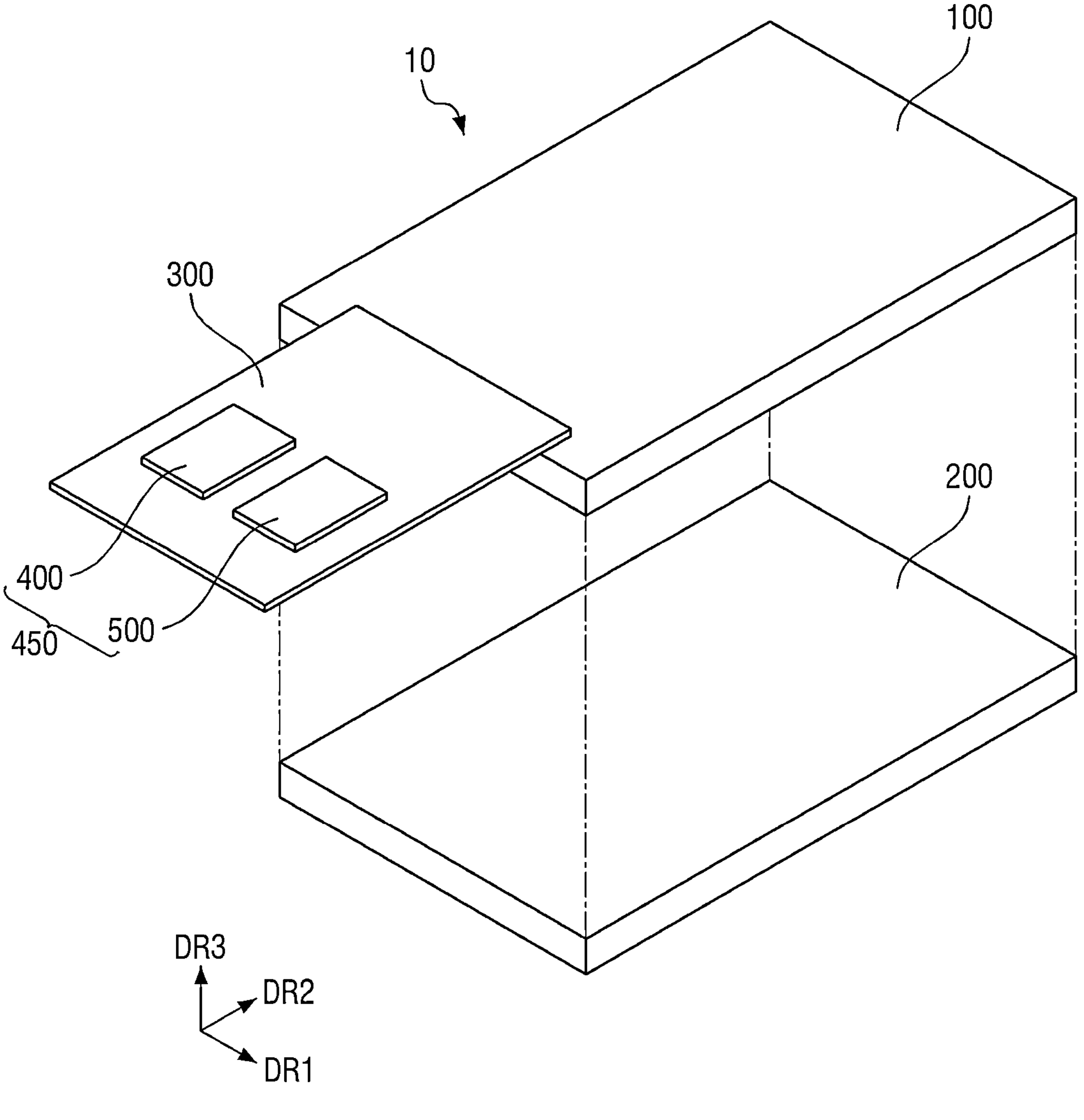
FIG. 1 is an exploded perspective view showing a display device according to an embodiment.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when a layer is referred to as being "on" another layer or substrate, it can be directly on the other layer or substrate, or intervening layers may also be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings.

Figure 2:
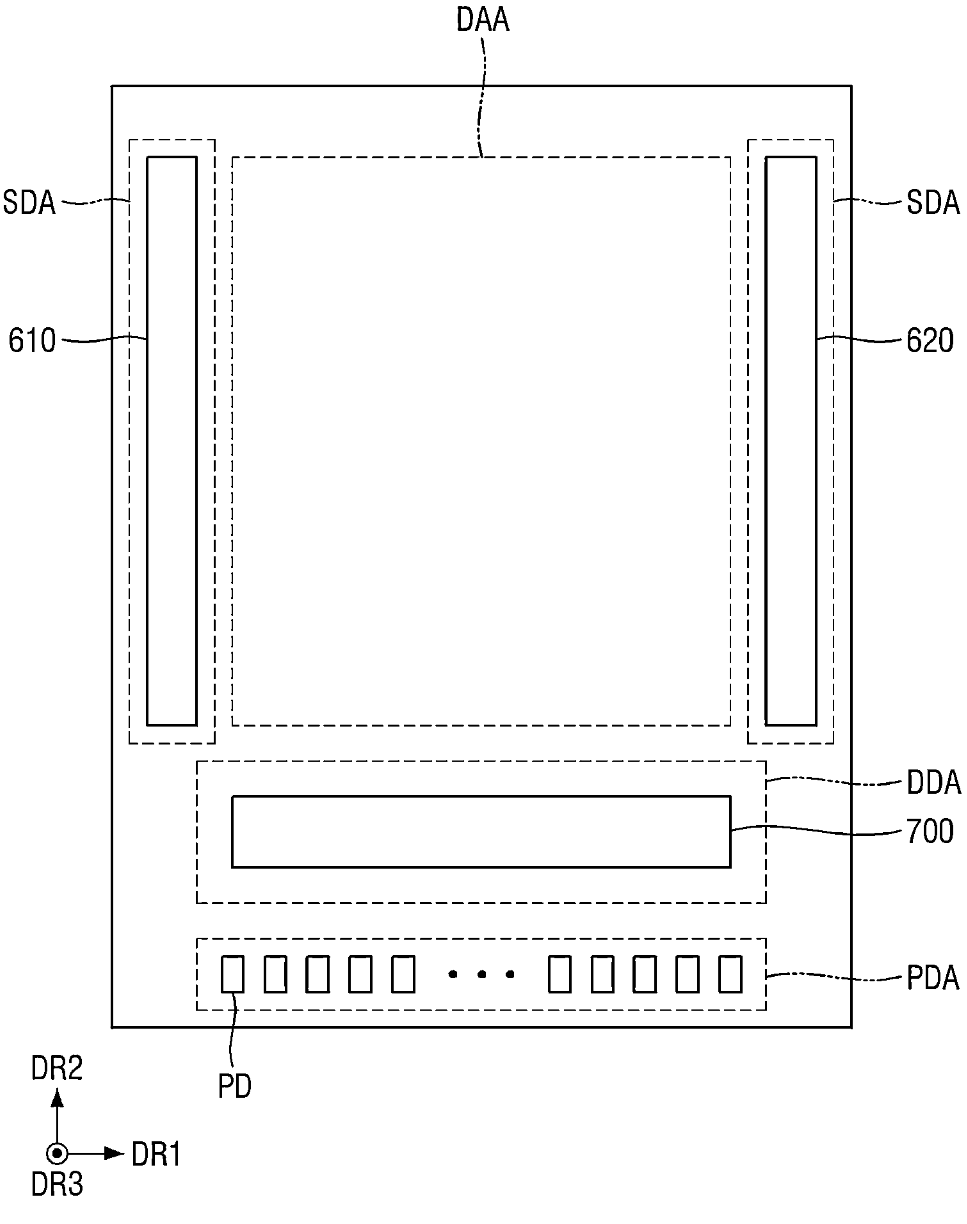
FIG. 2 is a schematic plan view illustrating an embodiment of the display panel shown in FIG. 1.
Figure 3:
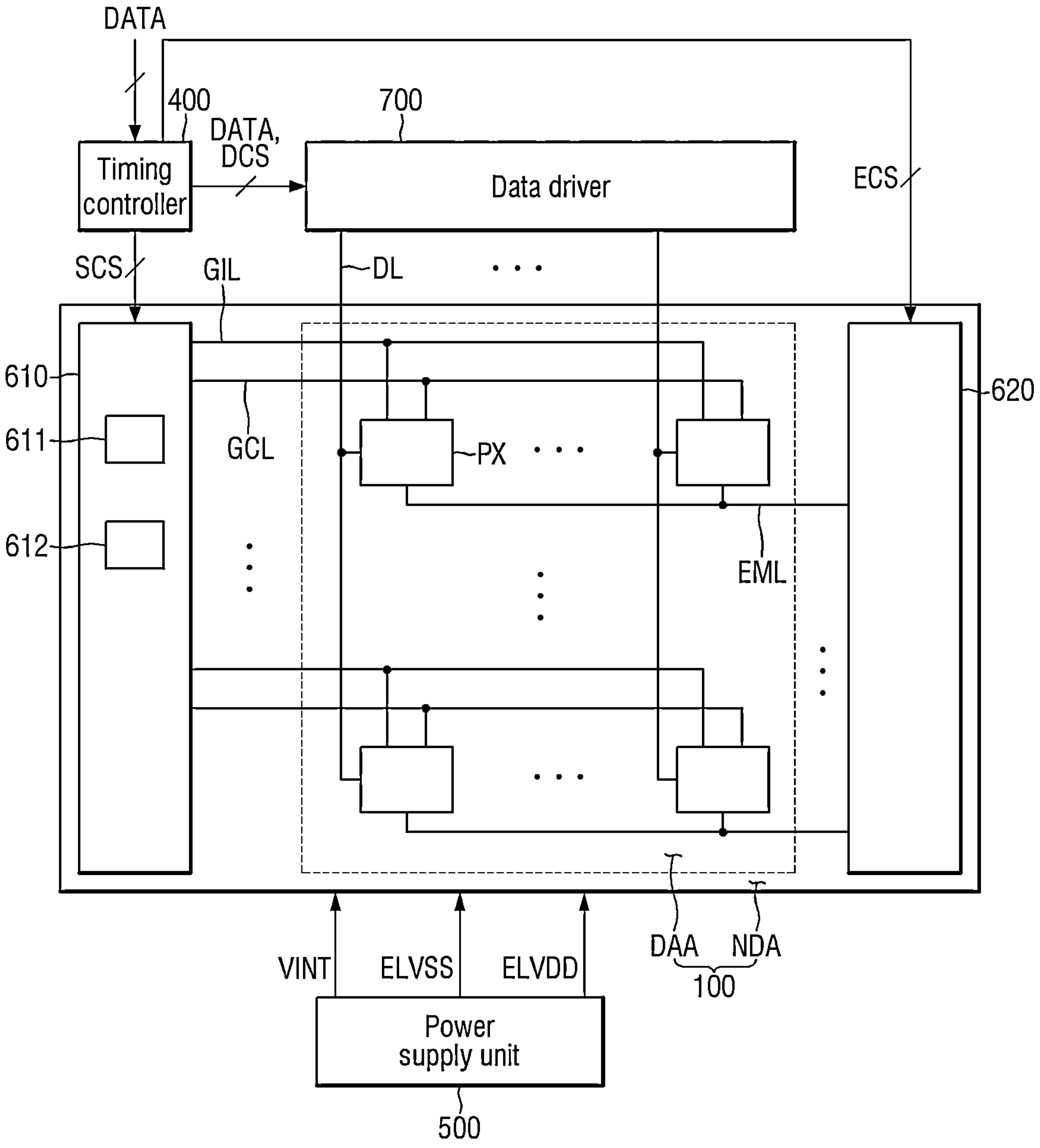
FIG. 3 is a block diagram illustrating a display device according to an embodiment.

FIG. 1 is an exploded perspective view showing a display device according to an embodiment. FIG. 2 is a schematic plan view illustrating an embodiment of the display panel shown in FIG. 1. FIG. 3 is a block diagram illustrating a display device according to an embodiment.

Referring to FIGS. 1 and 2, a display device 10 according to an embodiment is a device that displays a moving image or a still image. The display device 10 according to an embodiment may be applied to portable electronic devices such as a mobile phone, a smartphone, a tablet personal computer (PC), a mobile communication terminal, an electronic organizer, an electronic book, a portable multimedia player (PMP), a navigation system, an ultra mobile PC (UMPC) or the like. For example, the display device 10 may be applied as a display unit of a television, a laptop, a monitor, a billboard, or an Internet-of-Things (IoT) device. Alternatively, the display device 10 may be applied to a smart watch, a watch phone, a head mounted display (HMD) for implementing virtual reality and augmented reality, or the like.

The display device 10 according to an embodiment includes a display panel 100, a heat dissipation layer 200, a circuit board 300, and a driving circuit 450.

The display panel 100 may have a planar shape similar to a quadrilateral shape. In an embodiment, for example, the display panel 100 may have a planar shape similar to a quadrilateral shape, having a short side of a first direction DR1 and a long side of a second direction DR2 crossing the first direction DR1. In such an embodiment of the display panel 100, a corner where a short side in the first direction DR1 and a long side in the second direction DR2 meet may be right-angled or rounded with a predetermined curvature. The planar shape of the display panel 100 is not limited to a rectangular shape, and may be a shape similar to another polygonal shape, a circular shape, or an elliptical shape. The planar shape of the display device 10 may conform to the planar shape of the display panel 100, but the embodiment of the disclosure is not limited thereto.

The display panel 100 includes a display area DAA in which an image is displayed and a non-display area NDA in which no image is displayed as shown in FIG. 2.

In an embodiment, as shown in FIG. 3, the display area DAA includes a plurality of pixels PX, a plurality of gate lines GCL, a plurality of emission control lines EML, and a plurality of data lines DL.

Each of the plurality of pixels PX includes a light emitting element that emits light. The plurality of pixels PX may be arranged in a matrix form in the first direction DR1 and the second direction DR2. The plurality of gate lines GCL and the plurality of emission control lines EML may extend in the first direction DR1, while being arranged in the second direction DR2. The plurality of data lines DL may extend in the second direction DR2, while being arranged in the first direction DR1.

The plurality of gate lines GCL include a plurality of first gate lines and a plurality of second gate lines. The plurality of emission control lines EML include a plurality of first emission control lines and a plurality of second emission control lines.

Figure 4:
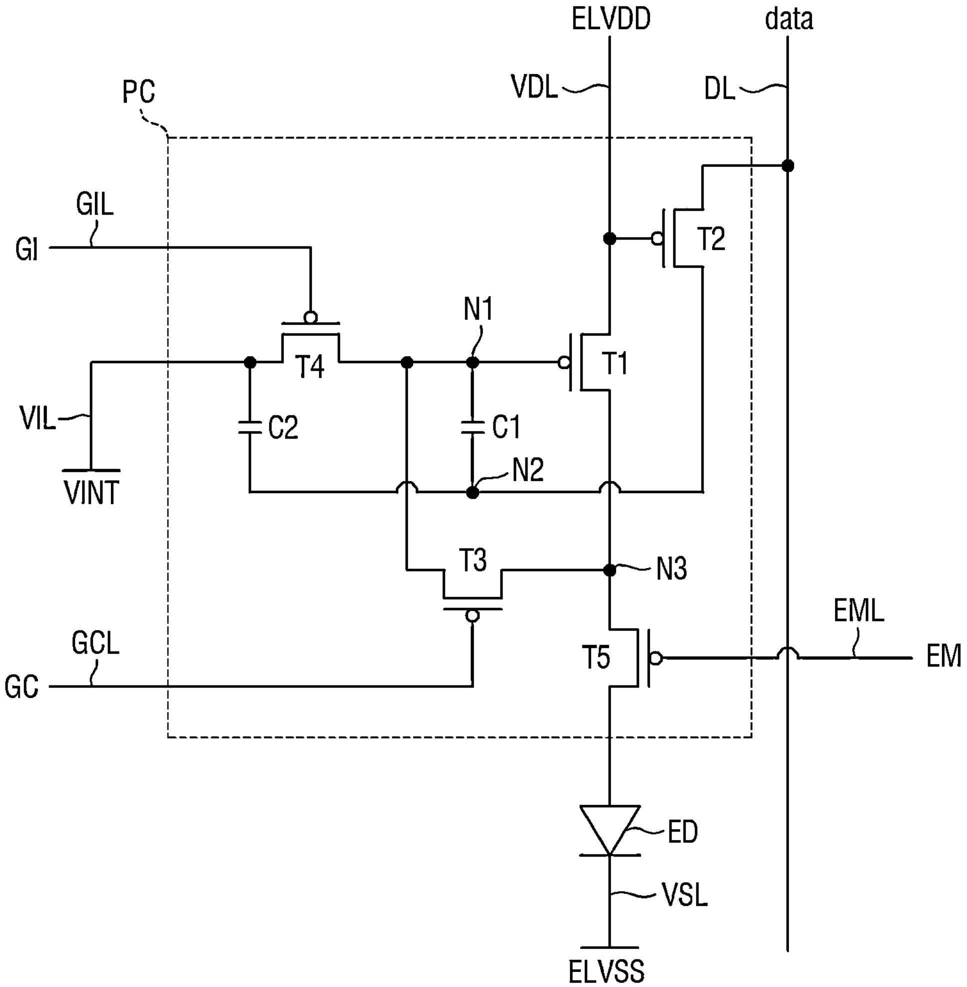
FIG. 4 is an equivalent circuit diagram of a pixel according to an embodiment.
Figure 5:
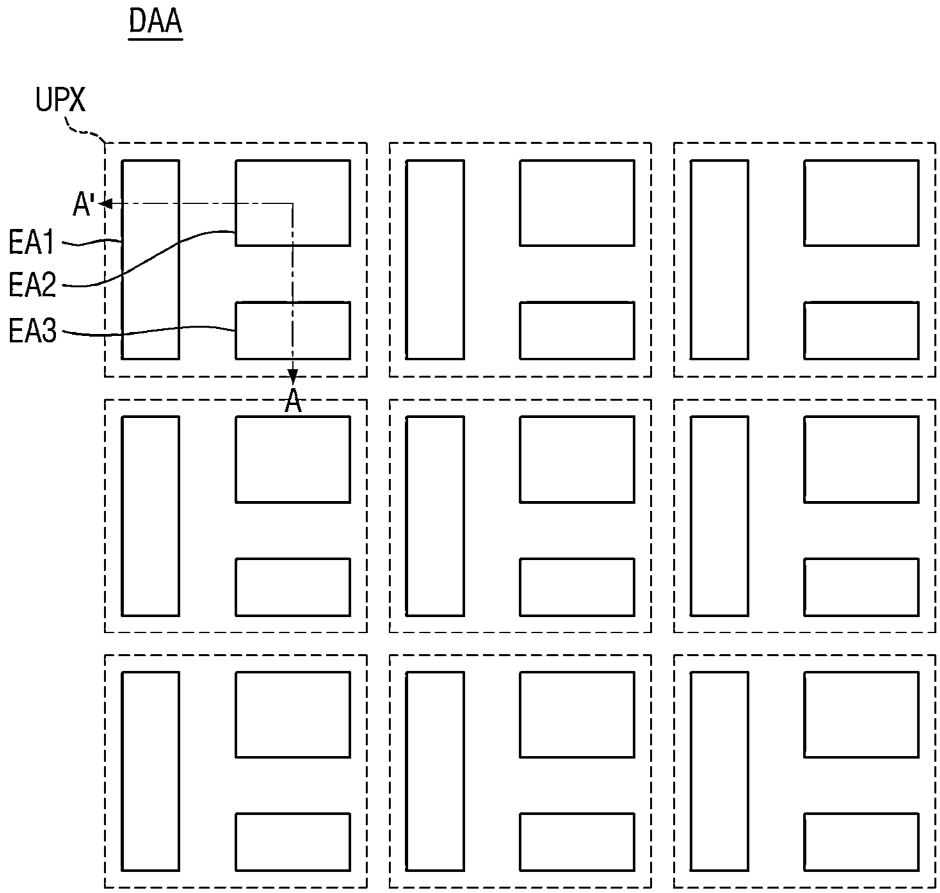
FIG. 5 is a schematic plan view illustrating pixels of a display area according to an embodiment.

Each of a plurality of unit pixels UPX includes a plurality of pixels PX1, PX2, and PX3 (shown in FIG. 5). The plurality of pixels PX1, PX2, and PX3 may include a plurality of pixel transistors (e.g., T1 to T5 in FIG. 4), and the plurality of pixel transistors are formed through a semiconductor process, and may be disposed on a semiconductor substrate (e.g., SSUB in FIG. 6). In an embodiment, for example, the plurality of pixel transistors may include or be formed of a complementary metal oxide semiconductor (CMOS).

Each of the pixels PX1, PX2, and PX3 may be connected to a corresponding one of the first gate lines GIL, a corresponding one of the second gate lines GCL, a corresponding one of the emission control lines EML, and a corresponding one of the data lines DL (shown in FIG. 4). Each of the pixels PX1, PX2, and PX3 may receive a data voltage of the data line DL in response to a first gate signal of the first gate line, and may emit a light emitting element based on the data voltage.

In an embodiment, as shown in FIG. 2, the non-display area NDA includes a scan driving area SDA, a data driving area DDA, and a pad area PDA.

The scan driving area SDA may be an area in which a scan driver 610 and an emission driver 620 are disposed. Although an embodiment where the scan driver 610 is disposed on the left side of the display area DAA and the emission driver 620 is disposed on the right side of the display area DAA is illustrated in FIG. 2, the embodiment of the disclosure is not limited thereto. In an embodiment, for example, the scan driver 610 and the emission driver 620 may be disposed on both the left side and the right side of the display area DAA.

The scan driver 610 includes a plurality of scan transistors, and the emission driver 620 includes a plurality of light emitting transistors. The plurality of scan transistors and the plurality of light emitting transistors may be formed through a semiconductor process, and may be formed on the semiconductor substrate described above. In an embodiment, for example, the plurality of scan transistors and the plurality of light emitting transistors may include or be formed of a CMOS.

The scan driver 610 may include a first scan signal output unit 611 and a second scan signal output unit 612. Each of the first scan signal output unit 611 and the second scan signal output unit 612 may receive a scan timing control signal SCS from a timing control circuit 400. The first scan signal output unit 611 may generate the first gate signals GI in response to the scan timing control signal SCS of the timing control circuit 400 and sequentially output the first gate signals GI to the first gate lines GIL. The second scan signal output unit 612 may generate second gate signals GC in response to the scan timing control signal SCS and sequentially output the second gate signals GC to the second gate lines GCL.

The emission driver 620 may receive an emission timing control signal ECS from the timing control circuit 400. The emission driver 620 may generate emission control signals EM in response to the emission timing control signal ECS and sequentially output the emission control signals EM to the emission control lines EML.

The data driving area DDA may be an area in which a data driver 700 is disposed. The data driver 700 may include a plurality of data transistors, and the plurality of data transistors may be formed on the aforementioned semiconductor substrate through a semiconductor process. In an embodiment, for example, the plurality of data transistors may include or be formed of a CMOS.

The data driver 700 may receive the digital video data DATA and the data timing control signal DCS from the timing control circuit 400. The data driver 700 converts the digital video data DATA into analog data voltages in response to the data timing control signal DCS and outputs the analog data voltages to data lines DL. In this case, the pixels PX1, PX2, and PX3 are selected by the first gate signal of the scan driver 610, and data voltages may be supplied to the selected pixels PX1, PX2, and PX3.

The pad area PDA includes a plurality of pads PD arranged in the first direction DR1. Each of the plurality of pads PD may be exposed without being covered by a cover layer CVL (see FIG. 6) and a polarizing plate (not shown).

The heat dissipation layer 200 may overlap the display panel 100 in a third direction DR3, which is a thickness direction of the display panel 100. The heat dissipation layer 200 may be disposed on one surface of the display panel 100, for example, on the rear surface thereof. The heat dissipation layer 200 serves to dissipate heat generated from the display panel 100. The heat dissipation layer 200 may include a metal layer such as graphite, silver (Ag), copper (Cu), or aluminum (Al) having high thermal conductivity.

The circuit board 300 may be electrically connected to the plurality of pads PD in the pad area PDA of the display panel 100 by using a conductive adhesive member such as an anisotropic conductive film. The circuit board 300 may be a flexible printed circuit board with a flexible material, or a flexible film. Although the circuit board 300 in an unfolded state is illustrated in FIG. 1, the circuit board 300 may be bent. In this case, one end of the circuit board 300 may be disposed on the rear surface of the display panel 100. The one end of the circuit board 300 may be an end opposite to the other end of the circuit board 300 that is connected to the plurality of pads PD of the pad area PDA of the display panel 100 by using a conductive adhesive member.

The driving circuit 450 may include the timing control circuit 400 and a power supply circuit 500.

The timing control circuit 400 may receive digital video data and timing signals input from the outside. The timing control circuit 400 may generate the scan timing control signal SCS, the emission timing control signal ECS, and a data timing control signal DCS for controlling the display panel 100 in response to the timing signals. The timing control circuit 400 may output the scan timing control signal SCS to the scan driver 610, and output the emission timing control signal ECS to the emission driver 620. The timing control circuit 400 may output the digital video data and the data timing control signal DCS to the data driver 700.

The power supply circuit 500 may generate a plurality of panel driving voltages according to a power voltage from the outside. In an embodiment, for example, the power supply circuit 500 may generate a common voltage ELVSS, a driving voltage ELVDD, and an initialization voltage VINT and supply the common voltage ELVSS, the driving voltage ELVDD, and the initialization voltage VINT to the display panel 100. The common voltage ELVSS, the driving voltage ELVDD, and the initialization voltage VINT will be described later in conjunction with FIG. 4.

Each of the timing control circuit 400 and the power supply circuit 500 may be formed as an integrated circuit (IC) and attached to one side of the circuit board 300. The scan timing control signal SCS, the emission timing control signal ECS, the digital video data DATA, and the data timing control signal DCS of the timing control circuit 400 may be supplied to the display panel 100 through the circuit board 300. The common voltage ELVSS, the driving voltage signal ELVDD, and the initialization voltage VINT of the power supply circuit 500 may be supplied to the display panel 100 through the circuit board 300.

FIG. 4 is an equivalent circuit diagram of a pixel PX according to an embodiment.

In an embodiment, as shown in FIG. 4, the pixel PX may be connected to a first gate line GIL, a second gate line GCL, an emission control line EML, the data line DL, a driving voltage line VDL, and a common voltage line VSL. Here, the common voltage line VSL may be connected to the common electrode (e.g., cathode electrode) of the light emitting element ED.

The pixel PX may include a pixel circuit PC and the light emitting element ED.

The pixel circuit PC may include a first transistor T1, a second transistor T2, a third transistor T3, a fourth transistor T4, a fifth transistor T5, a first capacitor C1, and a second capacitor C2.

The first transistor T1 (for example, a driving transistor) may include a gate electrode, a source electrode, and a drain electrode. The first transistor T1 may control a source-drain current (hereinafter, a driving current) based on the data voltage applied to the gate electrode thereof. The driving current (Isd) flowing through a channel region of the first transistor T1 may be proportional to the square of a difference between the threshold voltage (Vth) and the voltage (Vsg) between the source electrode and the gate electrode of the first transistor T1 ($Isd=k\times(Vsg-Vth)^2$). Here, Isd denotes the driving current, k denotes a proportional coefficient determined by the structure and physical characteristics of the first transistor T1, Vsg denotes a source-gate voltage of the first transistor T1, and Vth denotes a threshold voltage of the first transistor T1. The gate electrode of the first transistor T1 may be electrically connected to a first node N1, the source electrode thereof may be electrically connected to the driving voltage line VDL, and the drain electrode thereof may be electrically connected to a third node N3.

The light emitting element ED may emit light by receiving the driving current (Isd). The emission amount or the luminance of the light emitting element ED may be proportional to the magnitude of the driving current (Isd). In an embodiment, the light emitting element ED may be an organic light emitting diode including a first electrode, a second electrode, and an organic light emitting layer disposed between the first electrode and the second electrode. In another embodiment, for example, the light emitting element ED may be an inorganic light emitting element including a first electrode, a second electrode, and an inorganic semiconductor disposed between the first electrode and the second electrode. In another embodiment, for example, the light emitting element ED may be a quantum dot light emitting element including a first electrode, a second electrode, and a quantum dot light emitting layer disposed between the first electrode and the second electrode. In another embodiment, for example, the light emitting element ED may be a micro light emitting diode. The first electrode of the light emitting element ED may be electrically connected to the drain electrode of the fifth transistor T5. The second electrode of the light emitting element ED may be connected to the common voltage line VSL. The second electrode of the light emitting element ED may receive a common voltage (e.g., low potential voltage) from the common voltage line VSL. The first electrode of the light emitting element may be an anode electrode and the second electrode of the light emitting element may be a cathode electrode.

The second transistor T2 may be turned on by the driving voltage signal ELVDD from the driving voltage line VDL to electrically connect the data line DL to a second node N2. The gate electrode of the second transistor T2 may be electrically connected to the driving voltage line VDL, the source electrode thereof may be electrically connected to the data line DL, and the drain electrode thereof may be electrically connected to the second node N2. In this case, the data line DL may transmit a data voltage (Vdt) or a reference voltage (Vref) (shown in FIG. 7).

The third transistor T3 may be turned on by the second gate signal GC from the second gate line GCL to electrically connect the first node N1 to the third node N3. The gate electrode of the third transistor T3 may be electrically connected to the second gate line GCL, the source electrode thereof may be electrically connected to the third node N3, and the drain electrode thereof may be electrically connected to the first node N1.

The fourth transistor T4 may be turned on by the first gate signal GI from the first gate line GIL and may electrically connect the first node N1 to an initialization voltage line VIL. The gate electrode of the fourth transistor T4 may be electrically connected to the first gate line GIL, the source electrode thereof may be electrically connected to the first node N1, and the drain electrode thereof may be electrically connected to the initialization voltage line VIL. The initialization voltage line VIL may transmit the initialization voltage VINT that is a direct current voltage. In an embodiment, instead of the initialization voltage, a different direct current voltage may be applied to the drain electrode of the fourth transistor T4.

The fifth transistor T5 may be turned on by an emission control signal EM received from the emission control line EML to electrically connect the third node N3 to the first electrode of the light emitting element ED. The gate electrode of the fifth transistor T5 may be electrically connected to the emission control line EML, the source electrode thereof may be electrically connected to the third node N3, and the drain electrode thereof may be electrically connected to the first electrode of the light emitting element ED.

The first capacitor C1 may be electrically connected between the first node N1 and the second node N2. In an embodiment, for example, a first electrode of the first capacitor C1 may be electrically connected to the first node N1, and a second electrode of the first capacitor C1 may be electrically connected to the second node N2.

The second capacitor C2 may be electrically connected between the initialization voltage line VIL and the second node N2. an embodiment, for example, a first electrode of the second capacitor C2 may be electrically connected to the initialization voltage line VIL, and a second electrode of the second capacitor C2 may be electrically connected to the second node N2.

At least one selected from the aforementioned first to fifth transistors T1 to T5 may be a metal-oxide-semiconductor field effect transistor (MOSFET). an embodiment, for example, each of the first to fifth transistors T1 to T5 may be a P-type MOSFET. In another embodiment, for example, each of the first to fifth transistors T1 to T5 may be an N-type MOSFET. In another embodiment, for example, some of the first to fifth transistors T1 to T5 may be P-type MOSFETs, and the other transistors may be N-type MOSFETs.

FIG. 5 is a schematic plan view illustrating pixels of a display area according to an embodiment.

Referring to FIG. 5, each of the plurality of unit pixels UPX may include a first emission area EA1 as an emission area of the first pixel PX1, a second emission area EA2 as an emission area of the second pixel PX2, and a third emission area EA3 as an emission area of the third pixel PX3.

Each of the first emission area EA1, the second emission area EA2, and the third emission area EA3 may have, in a plan view, a quadrilateral shape such as a rectangle, a square, or a diamond. In an embodiment, for example, the first emission area EA1 may have a rectangular shape, in a plan view, having a short side in the first direction DR1 and a long side in the second direction DR2. In an embodiment, each of the second emission area EA2 and the third emission area EA3 may have a rectangular shape, in plan view, having a long side in the first direction DR1 and a short side in the second direction DR2.

The length of the first emission area EA1 in the first direction DR1 may be smaller than the length of the second emission area EA2 in the first direction DR1, and may be smaller than the length of the third emission area EA3 in the first direction DR1. The length of the second emission area EA2 in the first direction DR1 and the length of the third emission area EA3 in the first direction DR1 may be substantially the same.

The length of the first emission area EA1 in the second direction DR2 may be greater than the sum of the length of the second emission area EA1 in the second direction DR2 and the length of third emission areas EA3 in the second direction DR2. The length of the second emission area EA2 in the second direction DR2 may be less than the length of the third emission area EA3 in the second direction DR2.

Although an embodiment where each of the first emission area EA1, the second emission area EA2, and the third emission area EA3 has a rectangular shape in a plan view is illustrated in FIG. 5, the embodiment of the disclosure is not limited thereto. in an embodiment, for example, each of the first emission area EA1, the second emission area EA2, and the third emission area EA3 may have a polygonal shape other than a quadrilateral shape, a circular shape, or an elliptical shape in plan view.

In each of the plurality of pixels PX, the first emission area EA1 and the second emission area EA2 may be adjacent to each other in the first direction DR1. Further, the first emission area EA1 and the third emission area EA3 may be adjacent to each other in the first direction DR1. In addition, the second emission area EA2 and the third emission area EA3 may be adjacent to each other in the second direction DR2. The area of the first emission area EA1, the area of the second emission area EA2, and the area of the third emission area EA3 may be different from each other.

The first emission area EA1 may emit light of a first color, the second emission area EA2 may emit light of a second color, and the third emission area EA3 may emit light of a third color. Here, the first color light may be light of a blue wavelength band, the second color light may be light of a green wavelength band, and the third color light may be light of a red wavelength band. In an embodiment, for example, the blue wavelength band may be a wavelength band of light whose main peak wavelength is in a range of about 370 nanometers (nm) to about 460 nm, the green wavelength band may be a wavelength band of light whose main peak wavelength is in a range of about 480 nm to about 560 nm, and the red wavelength band may be a wavelength band of light whose main peak wavelength is in a range of about 600 nm to about 750 nm.

In an embodiment, as shown in FIG. 5, each of the plurality of pixels PX includes three emission areas EA1, EA2, and EA3, but the embodiment of the disclosure is not limited thereto. In another embodiment, for example, each of the plurality of pixels PX may include four emission areas.

In addition, the arrangement of the emission areas of the plurality of pixels PX is not limited to that illustrated in FIG. 5. In an embodiment, for example, the emission areas of the plurality of pixels PX may be arranged in a stripe structure in which the emission areas are arranged in the first direction DR1, a PenTile® structure in which the emission areas are arranged in a diamond shape, or a hexagonal structure in which the emission areas having, in a plan view, a hexagonal shape are arranged side by side.

Figure 6:
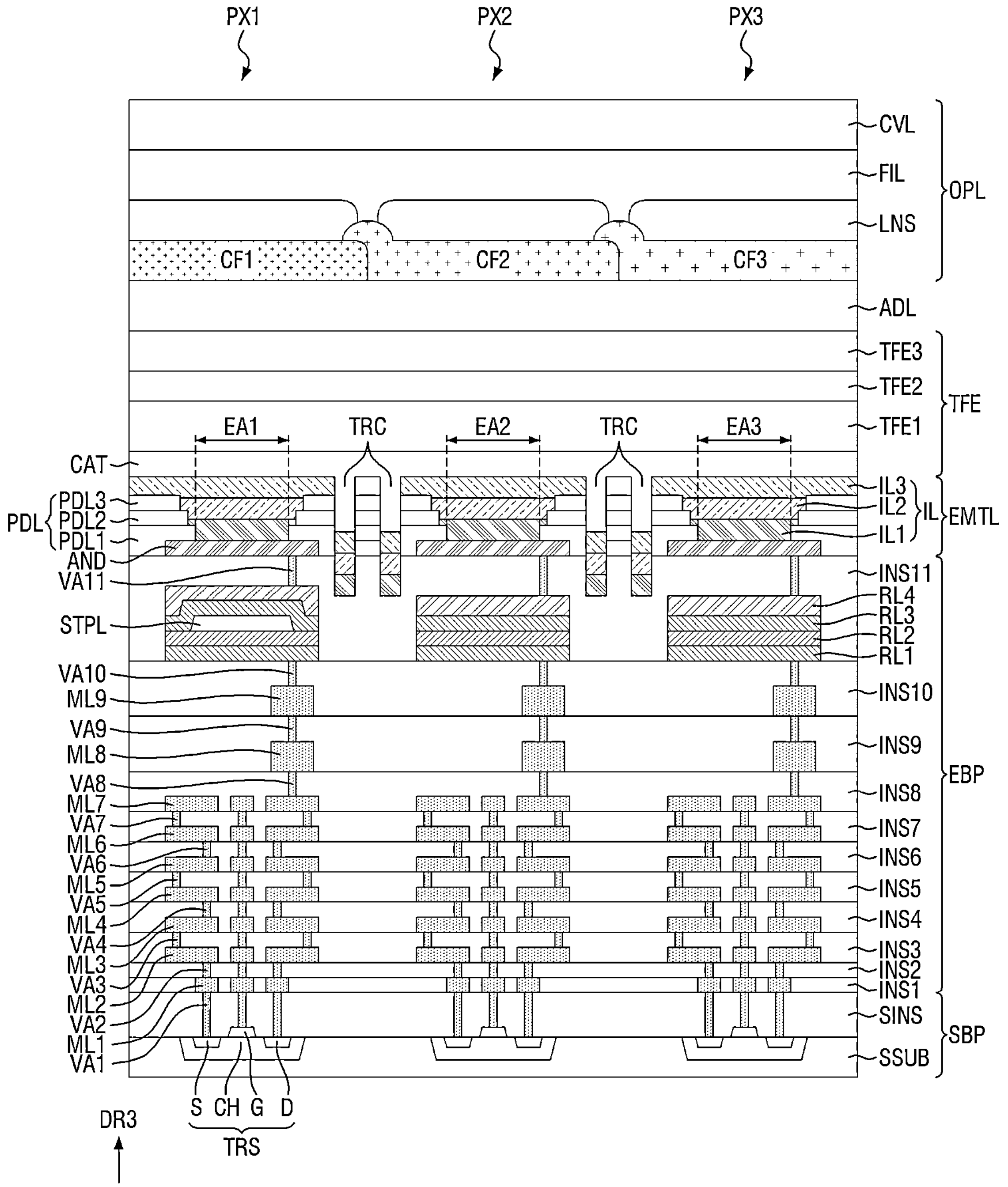
FIG. 6 is a cross-sectional view taken along line A-A' of FIG. 5 illustrating an embodiment of the display device.

FIG. 6 is a cross-sectional view taken along line A-A' of FIG. 5 illustrating an embodiment of the display device.

Referring to FIG. 6, an embodiment of a display panel 100 includes a semiconductor backplane SBP, a light emitting element backplane EBP, a light emitting element layer EMTL, an encapsulation layer TFE, an optical layer OPL, the cover layer CVL, and a polarizing plate (not shown).

The semiconductor backplane SBP includes the semiconductor substrate SSUB including a plurality of pixel transistors TRS, a semiconductor insulating layer SINS covering the plurality of pixel transistors TRS, and a plurality of first vias VA1 electrically connected to the plurality of pixel transistors TRS, respectively. The plurality of pixel transistors TRS may be the first to fourth transistors T1 to T4 described with reference to FIG. 4.

The semiconductor substrate SSUB may be a silicon substrate, a germanium substrate, or a silicon-germanium substrate. The semiconductor substrate SSUB may be a substrate doped with first type impurities. A plurality of well regions WA may be defined on the top surface of the semiconductor substrate SSUB. The plurality of well regions WA may be regions doped with a second type impurity. The second type impurity may be different from the aforementioned first type impurity. In an embodiment, for example, where the first type impurity is a p-type impurity, the second type impurity may be an n-type impurity. Alternatively, in an embodiment where the first type impurity is an n-type impurity, the second type impurity may be a p-type impurity.

Each of the well regions WA includes a source SA corresponding to the source of the pixel transistor TRS, a drain D corresponding to the drain thereof, and a channel region CH disposed between the source S and the drain D.

Each of the source S and the drain D may be a region doped with a first type impurity. A gate G of the pixel transistor TRS may overlap the well region WA in the third direction DR3. The channel region CH may overlap the gate G in the third direction DR3. The source S may be disposed on one side of the gate G, and the drain D may be disposed on the other side of the gate G.

Each of the plurality of well regions WA further includes a first low-concentration impurity region disposed between the channel region CH and the source S, and a second low-concentration impurity region disposed between the channel region CH and the drain D. The first low-concentration impurity region may be a region having an impurity concentration lower than that of the source S. The second low-concentration impurity region may be a region having an impurity concentration lower than that of the drain D. The distance between the source S and the drain D may increase due to the presence of the first low-concentration impurity region and the second low-concentration impurity region. Therefore, the length of the channel region CH of each of the pixel transistors TRS may increase, so that punch-through and hot carrier phenomena that might be caused by a short channel may be prevented.

A semiconductor insulating layer SINS may be disposed on the semiconductor substrate SSUB. The semiconductor insulating layer SINS may include or be formed of silicon carbonitride (SiCN) or a silicon oxide (SiOx)-based inorganic layer, but the embodiment of the disclosure is not limited thereto.

The plurality of first vias VA1 may be disposed on the pixel transistor TRS. The plurality of first vias VA1 may be connected to at least one selected from the gate GE, the source S, and the drain D of each pixel transistor TRS through a hole defined in the semiconductor insulating layer SINS. The plurality of first vias VA1 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof.

A first interlayer insulating layer INS1 may be disposed on the plurality of first vias VA1.

In an embodiment, the semiconductor substrate SSUB may be replaced with a glass substrate or a polymer resin substrate such as polyimide. In such an embodiment, thin film transistors may be disposed on the glass substrate or the polymer resin substrate. The glass substrate may be a rigid substrate that does not bend, and the polymer resin substrate may be a flexible substrate that can be bent or curved.

The light emitting element backplane EBP includes first to ninth metal layers ML1 to ML9, reflective metal layers RL1 to RL4, a plurality of vias VA2 to VA11, a plurality of interlayer insulating layers INS1 to INS11, and a step layer STPL.

The first to ninth metal layers ML1 to ML9 are connected to the pixel transistor TRS of the semiconductor backplane SBP to implement the circuit of the first pixel PX1 shown in FIG. 4. That is, the first to fourth transistors T1 to T4 are merely formed on the semiconductor backplane SBP, and the connection of the first to fourth transistors T1 to T4 and the first and second capacitors C1 and C2 is accomplished through the first to ninth metal layers ML1 to ML9. Additionally, the connection of the drain of the first transistor T1, the source of the fourth transistor T4, and the first electrode of the light emitting element ED is accomplished through the first to ninth metal layers ML1 to ML9.

The first interlayer insulating layer INS1 may be disposed on the semiconductor backplane SBP. In an embodiment, for example, the first interlayer insulating layer INS1 may be disposed on the semiconductor insulating layer SINS and the first vias VA1. The first vias VA1 may be disposed through the semiconductor insulating layer SINS and be connected to the exposed gate G, source S, and drain D of the pixel transistor TRS, respectively. Each of the first metal layers ML1 may be disposed on the semiconductor insulating layer SINS and may be connected to the first via VA1.

The second interlayer insulating layer INS2 may be disposed on the first interlayer insulating layer INS1 and the first metal layers ML1. Each of the second vias VA2 may penetrate the second interlayer insulating layer INS2 and be connected to the exposed first metal layer ML1. Each of the second metal layers ML2 may be disposed on the second interlayer insulating layer INS2 and may be connected to the second via VA2.

The third interlayer insulating layer INS3 may be disposed on the second interlayer insulating layer INS2 and the second metal layers ML2. Each of the third vias VA3 may be disposed through the third interlayer insulating layer INS3 and be connected to the exposed second metal layer ML2. Each of the third metal layers ML3 may be disposed on the third interlayer insulating layer INS3 and may be connected to the third via VA3.

A fourth interlayer insulating layer INS4 may be disposed on the third interlayer insulating layer INS3 and the third metal layers ML3. Each of the fourth vias VA4 may be disposed through the fourth interlayer insulating layer INS4 and be connected to the exposed third metal layer ML3. Each of fourth metal layers ML4 may be disposed on the fourth interlayer insulating layer INS4 and may be connected to the fourth via VA4.

A fifth interlayer insulating layer INS5 may be disposed on the fourth interlayer insulating layer INS4 and the fourth metal layers ML4. Each of the fifth vias VA5 may be disposed through the fifth interlayer insulating layer INS5 and be connected to the exposed fourth metal layer ML4. Each of fifth metal layers ML5 may be disposed on the fifth interlayer insulating layer INS5 and may be connected to the fifth via VA5.

A sixth interlayer insulating layer INS6 may be disposed on the fifth interlayer insulating layer INS5 and the fifth metal layers ML5. Each of the sixth vias VA6 may be disposed through the sixth interlayer insulating layer INS6 and be connected to the exposed fifth metal layer ML5. Each of sixth metal layers ML6 may be disposed on the sixth interlayer insulating layer INS6 and may be connected to the sixth via VA6.

A seventh interlayer insulating layer INS7 may be disposed on the sixth interlayer insulating layer INS6 and the sixth metal layers ML6. Each of the seventh vias VA7 may be disposed through the seventh interlayer insulating layer INS7 and be connected to the exposed sixth metal layer ML6. Each of seventh metal layers ML7 may be disposed on the seventh interlayer insulating layer INS7 and may be connected to the seventh via VA7.

An eighth interlayer insulating layer INS8 may be disposed on the seventh interlayer insulating layer INS7 and the seventh metal layers ML7. Each of the eighth vias VA8 may be disposed through the eighth interlayer insulating layer INS8 and be connected to the exposed seventh metal layer ML7. Each of eighth metal layers ML8 may be disposed on the eighth interlayer insulating layer INS8 and may be connected to the eighth via VA8.

A ninth interlayer insulating layer INS9 may be disposed on the eighth interlayer insulating layer INS8 and the eighth metal layers ML8. Each of the ninth vias VA9 may be disposed through the ninth interlayer insulating layer INS9 and be connected to the exposed eighth metal layer ML8. Each of the ninth metal layers ML9 may be disposed on the ninth interlayer insulating layer INS9 and may be connected to the ninth via VA9.

The first to ninth metal layers ML1 to ML9 may be made of substantially the same material as the first to ninth vias VA1 to VA9. The first to ninth metal layers ML1 to ML9 and the first to ninth vias VA1 to VA9 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof, i.e., an alloy of at least two selected therefrom. The first to ninth vias VA1 to VA9 may include or be made of substantially the same material as each other. In an embodiment, for example, the first to ninth interlayer insulating layers INS1 to INS9 may include or be formed of a silicon oxide (SiOx)-based inorganic layer, but the embodiment of the disclosure is not limited thereto.

The thickness of each of the second metal layer ML2, the third metal layer ML3, the fourth metal layer ML4, the fifth metal layer ML5, the sixth metal layer ML6, and the seventh metal layer ML7 may be greater than the thickness of each of the second via VA2, the third via VA3, the fourth via VA4, the fifth via VA5, the sixth via VA6, and the seventh via VA7. The thickness of each of the third metal layer ML3, the fourth metal layer ML4, the fifth metal layer ML5, the sixth metal layer ML6, and the seventh metal layer ML7 may be greater than the thickness of the second metal layer ML2. The thickness of the third metal layer ML3, the thickness of the fourth metal layer ML4, the thickness of the fifth metal layer ML5, the thickness of the sixth metal layer ML6, and the thickness of the seventh metal layer ML7 may be substantially the same as each other. In an embodiment, for example, the thickness of the second metal layer ML2 may be approximately 1360 angstrom (Å). The thickness of each of the third metal layer ML3, the fourth metal layer ML4, the fifth metal layer ML5, the sixth metal layer ML6, and the seventh metal layer ML7 may be approximately 1440 Å. The thickness of each of the second via VA2, the third via VA3, the fourth via VA4, the fifth via VA5, the sixth via VA6, and the seventh via VA7 may be approximately 1150 Å.

The thickness of each of the eighth metal layer ML8 and the ninth metal layer ML9 may be greater than the thickness of each of the second metal layer ML2, the third metal layer ML3, the fourth metal layer ML4, the fifth metal layer ML5, the sixth metal layer ML6, and the seventh metal layer ML7. The thickness of each of the eighth metal layer ML8 and the ninth metal layer ML9 may be greater than the thickness of each of the eighth via VA8 and the ninth via VA9. The thickness of each of the eighth via VA8 and the ninth via VA9 may be greater than the thickness of each of the second via VA2, the third via VA3, the fourth via VA4, the fifth via VA5, the sixth via VA6, and the seventh via VA7. The thickness of the eighth metal layer ML8 and the thickness of the ninth metal layer ML9 may be substantially the same as each other. In an embodiment, for example, the thickness of each of the eighth metal layer ML8 and the ninth metal layer ML9 may be approximately 9000 Å. In an embodiment, for example, the thickness of each of the eighth via VA8 and the ninth via VA9 may be approximately 6000 Å.

The tenth interlayer insulating layer INS10 may be disposed on the ninth interlayer insulating layer INS9 and the ninth metal layers ML9. In an embodiment, for example, the tenth insulating layer INS10 may include or be formed of a silicon oxide (SiOx)-based inorganic layer, but the embodiment of the disclosure is not limited thereto.

Each of the tenth vias VA10 may penetrate the tenth interlayer insulating layer INS10 and be connected to the exposed ninth metal layer ML9. The tenth vias VA10 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof. The thickness of the tenth via VA10 may be approximately 16500 Å.

Each of the first reflective electrodes RL1 may be disposed on the tenth interlayer insulating layer INS10, and may be connected to the tenth via VA10. The first reflective electrodes RL1 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof.

Each of the second reflective electrodes RL2 may be disposed on the first reflective electrode RL1. The second reflective electrodes RL2 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof. In an embodiment, for example, the second reflective electrodes RL2 may be made of titanium nitride (TiN).

In the first pixel PX1, the step layer STPL may be disposed on the second reflective electrode RL2. The step layer STPL may not be disposed in each of the second pixel PX2 and the third pixel PX3. In order to effectively reflect the light of the first color emitted from a first light emitting layer EML1 of the first pixel PX1, the thickness of the step layer STPL may be set in consideration of the wavelength of the light of the first color and the distance from the first light emitting layer EML1 to the fourth reflective electrode RL4. The step layer STPL may include or be formed of silicon carbonitride (SiCN) or a silicon oxide (SiOx)-based inorganic layer, but the embodiment of the disclosure is not limited thereto. In an embodiment, for example, the thickness of the step layer STPL may be about 400 Å.

In the first pixel PX1, the third reflective electrode RL3 may be disposed on the second reflective electrode RL2 and the step layer STPL. In the second pixel PX2 and the third pixel PX3, the third reflective electrode RL3 may be disposed on the second reflective electrode RL2. The third reflective electrodes RL3 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof.

In an embodiment, at least one selected from the first reflective electrode RL1, the second reflective electrode RL2, and the third reflective electrode RL3 may be omitted.

The fourth reflective electrodes RL4 may be respectively disposed on the third reflective electrodes RL3. The fourth reflective electrodes RL4 may reflect light from first to third intermediate layers EML1, EML2, and EML3. The fourth reflective electrodes RL4 may include a metal having high reflectivity to advantageously reflect the light. The fourth reflective electrodes RL4 may include or be formed of aluminum (Al), a stacked structure (Ti/Al/Ti) of aluminum and titanium, a stacked structure (ITO/Al/ITO) of aluminum and ITO, an APC alloy, which is an alloy of silver (Ag), palladium (Pd), and copper (Cu), and a stacked structure (ITO/APC/ITO) of the APC alloy and ITO, but the embodiment of the disclosure is not limited thereto. In an embodiment, for example, each of the fourth reflective electrodes RL4 may have a thickness of about 850 Å.

The eleventh interlayer insulating layer INS11 may be disposed on the tenth interlayer insulating layer INS10 and the fourth reflective electrodes RL4. The eleventh insulating layer INS11 may include or be formed of a silicon oxide (SiOx)-based inorganic layer, but the embodiment of the disclosure is not limited thereto.

Each of the eleventh vias VA11 may penetrate the eleventh interlayer insulating layer INS11 and be connected to the exposed tenth metal layer ML10. The eleventh vias VA11 may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof. Due to the presence of the step layer STPL, the thickness of the eleventh via VA11 in the first pixel PX1 may be less than the thickness of the eleventh via VA11 in each of the second pixel PX2 and the third pixel PX3. In an embodiment, for example, the thickness of the eleventh via VA11 in the first pixel PX1 may be about 800 Å, and the thickness of the eleventh via VA11 in each of the second pixel PX2 and the third pixel PX3 may be about 1200 Å.

The light emitting element layer EMTL may be disposed on the light emitting element backplane EBP. The light emitting element layer EMTL may include the light emitting elements ED, each of which includes a first electrode AND, an intermediate layer IL and a second electrode CAT, a pixel defining layer PDL, and a plurality of trenches TRC.

The first electrode AND of each of the light emitting elements ED may be disposed on the eleventh interlayer insulating layer INS11 and connected to the eleventh via VA11. The first electrode AND of each of the light emitting elements ED may be connected to the drain D or the source S of the pixel transistor TRS through the eleventh via VA11, the first to fourth reflective electrodes RL1 to RL4, the first to tenth vias VA1 to VA10, and the first to ninth metal layers ML1 to ML9. The first electrode AND of each of the light emitting elements ED may include or be formed of at least one selected from copper (Cu), aluminum (Al), tungsten (W), molybdenum (Mo), chromium (Cr), gold (Au), titanium (Ti), nickel (Ni), and neodymium (Nd), or an alloy thereof. In an embodiment, for example, the first electrode AND of each of the light emitting elements ED may be titanium nitride (TiN).

The pixel defining layer PDL may be disposed on a part of the first electrode AND of each of the light emitting elements ED. The pixel defining layer PDL may cover the edge of the first electrode AND of each of the light emitting elements ED. The pixel defining layer PDL may serve to partition the first emission areas EA1, the second emission areas EA2, and the third emission areas EA3.

The first emission area EA1 may be defined as an area in which the first electrode AND, the intermediate layer IL, and the second electrode CAT are sequentially stacked in the first pixel PX1 to emit light. The second emission area EA2 may be defined as an area in which the first electrode AND, the intermediate layer IL, and the second electrode CAT are sequentially stacked in the second pixel PX2 to emit light. The third emission area EA3 may be defined as an area in which the first electrode AND, the intermediate layer IL, and the second electrode CAT are sequentially stacked in the third pixel PX3 to emit light.

The pixel defining layer PDL may include first to third pixel defining layers PDL1, PDL2, and PDL3. The first pixel defining layer PDL1 may be disposed on the edge of the first electrode AND of each of the light emitting elements ED, the second pixel defining layer PDL2 may be disposed on the first pixel defining layer PDL1, and the third pixel defining layer PDL3 may be disposed on the second pixel defining layer PDL2. The first pixel defining layer PDL1, the second pixel defining layer PDL2, and the third pixel defining layer PDL3 may include or be formed of a silicon oxide (SiOx)-based inorganic layer, but the embodiment of the disclosure is not limited thereto. In an embodiment, for example, the first pixel defining layer PDL1, the second pixel defining layer PDL2, and the third pixel defining layer PDL3 may each have a thickness of about 500 Å.

Each of the plurality of trenches TRC may penetrate the first pixel defining layer PDL1, the second pixel defining layer PDL2, and the third pixel defining layer PDL3. The eleventh interlayer insulating layer INS11 may be partially recessed at each of the plurality of trenches TRC.

At least one trench TRC may be disposed or defined between adjacent pixels PX1, PX2, and PX3. Although FIG. 6 illustrates an embodiment where two trenches TRC are defined between adjacent pixels PX1, PX2, and PX3, the embodiment of the disclosure is not limited thereto.

The intermediate layer IL may include a first intermediate layer IL1, a second intermediate layer IL2, and a third intermediate layer IL3.

The intermediate layer IL may have a tandem structure including the plurality of intermediate layers IL1, IL2, and IL3 that emit different lights. In an embodiment, for example, the intermediate layer IL may include the first intermediate layer IL1 that emits light of the first color, the second intermediate layer IL2 that emits light of the third color, and the third intermediate layer IL2 that emits light of the second color. The first intermediate layer IL1, the second intermediate layer IL2, and the third intermediate layer IL3 may be sequentially stacked.

The first intermediate layer IL1 may have a structure in which a first hole transport layer, a first organic light emitting layer that emits light of the first color, and a first electron transport layer are sequentially stacked. The second intermediate layer IL2 may have a structure in which a second hole transport layer, a second organic light emitting layer that emits light of the third color, and a second electron transport layer are sequentially stacked. The third intermediate layer IL3 may have a structure in which a third hole transport layer, a third organic light emitting layer that emits light of the second color, and a third electron transport layer are sequentially stacked.

A first charge generation layer for supplying charges to the second intermediate layer IL2 and supplying electrons to the first intermediate layer IL1 may be disposed between the first intermediate layer IL1 and the second intermediate layer IL2. A second charge generation layer for supplying charges to the third intermediate layer IL3 and supplying electrons to the second intermediate layer IL2 may be disposed between the second intermediate layer IL2 and the third intermediate layer IL3.

The first intermediate layer IL1 may be disposed on the first electrodes AND and the pixel defining layer PDL, and may be disposed on the bottom surface of each trench TRC. Due to the trench TRC, the first intermediate layer IL1 may be separated between adjacent pixels PX1, PX2, and PX3. The second intermediate layer IL2 may be disposed on the first intermediate layer IL1. Due to the trench TRC, the second intermediate layer IL2 may be separated or disconnected at a boundary between adjacent pixels PX1, PX2, and PX3. The third intermediate layer IL3 may be disposed on the second intermediate layer IL2. Due to the trench TRC, the third intermediate layer IL3 may be separated between adjacent pixels PX1, PX2, and PX3. That is, each of the plurality of trenches TRC may be a structure for separating the first to third intermediate layers IL1, IL2, and IL3 of the light emitting element layer EMTL between adjacent pixels PX1, PX2, and PX3.

In order to stably separate the first to third intermediate layers IL1, IL2, and IL3 of the light emitting element layer EMTL between adjacent pixels PX1, PX2, and PX3, the height of each of the plurality of trenches TRC may be greater than the height of the pixel defining layer PDL. The height of each of the plurality of trenches TRC refers to the length of each of the plurality of trenches TRC in the third direction DR3. The height of the pixel defining layer PDL refers to the length of the pixel defining layer PDL in the third direction DR3.

In order to cut off the first to third intermediate layers IL1, IL2, and IL3 of the light emitting element layer EMTL between the neighboring pixels PX1, PX2, and PX3, another structure may exist instead of the trench TRC. In an embodiment, for example, instead of the trench TRC, a reverse tapered partition wall may be disposed on the pixel defining layer PDL.

The number of the intermediate layers IL1, IL2, and IL3 that emit different lights is not limited to that shown in FIG. 6. In an embodiment, for example, the intermediate layer IL may include two intermediate layers. In such an embodiment, one of the two intermediate layers may be substantially the same as the first intermediate layer IL1, and the other may include a second hole transport layer, a second organic light emitting layer, a third organic light emitting layer, and a second electron transport layer. In such an embodiment, a charge generation layer for supplying electrons to one intermediate layer and supplying charges to the other intermediate layer may be disposed between the two intermediate layers.

In addition, FIG. 6 illustrates an embodiment where the first to third intermediate layers IL1, IL2, and IL3 are all disposed in the first emission area EA1, the second emission area EA2, and the third emission area EA3, but the embodiment of the disclosure is not limited thereto. In an embodiment, for example, the first intermediate layer IL1 may be disposed in the first emission area EA1 and may not be disposed in the second emission area EA2 and the third emission area EA3. In an embodiment, the second intermediate layer IL2 may be disposed in the second emission area EA2 and may not be disposed in the first emission area EA1 and the third emission area EA3. In an embodiment, the third intermediate layer IL3 may be disposed in the third emission area EA3 and may not be disposed in the first emission area EA1 and the second emission area EA2. In such an embodiment, first to third color filters CF1, CF2, and CF3 of the optical layer OPL may be omitted.

The second electrode CAT may be disposed on the third intermediate layer IL3. The second electrode CAT may be disposed on the third intermediate layer IL3 in each of the plurality of trenches TRC. The second electrode CAT may include or be formed of a transparent conductive material (TCO) such as ITO or IZO that can transmit light or a semi-transmissive conductive material such as magnesium (Mg), silver (Ag), or an alloy of Mg and Ag. In an embodiment where the second electrode CAT is formed of a semi-transmissive conductive material, the light emission efficiency may be improved in each of the first to third pixels PX1, PX2, and PX3 due to a micro-cavity effect.

The encapsulation layer TFE may be disposed on the light emitting element layer EMTL. The encapsulation layer TFE may include at least one inorganic layer TFE1 and TFE2 to prevent oxygen or moisture from permeating into the light emitting element layer EMTL. In addition, the encapsulation layer ENC may include at least one organic layer to protect the light emitting element layer EMTL from foreign substances such as dust. In an embodiment, for example, the encapsulation layer ENC may include a first encapsulation inorganic layer TFE1, an encapsulation organic layer TFE2, and a second encapsulation inorganic layer TFE3.

The first encapsulation inorganic layer TFE1 may be disposed on the second electrode CAT, the encapsulation organic layer TFE2 may be disposed on the first encapsulation inorganic layer TFE1, and the second encapsulation inorganic layer TFE3 may be disposed on the encapsulation organic layer TFE2. The first encapsulation inorganic layer TFE1 and the second encapsulation inorganic layer TFE3 may include or be formed of multiple layers in which one or more inorganic layers of silicon nitride (SiNx), silicon oxynitride (SiON), silicon oxide (SiOx), titanium oxide (TiOx), and aluminum oxide (AlOx) layers are alternately stacked. The encapsulation organic layer TFE2 may be a monomer. Alternatively, the encapsulation organic layer TFE2 may be an organic layer such as acryl resin, epoxy resin, phenolic resin, polyamide resin, polyimide resin or the like.

An adhesive layer ADL may be a layer for bonding the encapsulation layer TFE to the optical layer OPL. The adhesive layer ADL may be a double-sided adhesive member. In addition, the adhesive layer ADL may be a transparent adhesive member such as a transparent adhesive or a transparent adhesive resin.

The optical layer OPL includes a plurality of color filters CF1, CF2, and CF3, a plurality of lenses LNS, and a filling layer FIL. The plurality of color filters CF1, CF2, and CF3 may include the first to third color filters CF1, CF2, and CF3. The first to third color filters CF1, CF2, and CF3 may be disposed on the adhesive layer ADL.

The first color filter CF1 may overlap the first emission area EA1 of the first pixel PX1. The first color filter CF1 may transmit light of the first color, i.e., light of a blue wavelength band. The blue wavelength band may be approximately 370 nm to 460 nm. Thus, the first color filter CF1 may transmit light of the first color among light emitted from the first emission area EA1.

The second color filter CF2 may overlap the second emission area EA2 of the second pixel PX2. The second color filter CF2 may transmit light of the second color, i.e., light of a green wavelength band. The green wavelength band may be approximately 480 nm to 560 nm. Thus, the second color filter CF2 may transmit light of the second color among light emitted from the second emission area EA2.

The third color filter CF3 may overlap the third emission area EA3 of the third pixel PX3. The third color filter CF3 may transmit light of the third color, i.e., light of a red wavelength band. The red wavelength band may be approximately 600 nm to 750 nm. Thus, the third color filter CF3 may transmit light of the third color among light emitted from the third emission area EA3.

The plurality of lenses LNS may be disposed on the first color filter CF1, the second color filter CF2, and the third color filter CF3, respectively. Each of the plurality of lenses LNS may be a structure for increasing a ratio of light directed to the front of the display device 10. Each of the plurality of lenses LNS may have a cross-sectional shape that is convex in an upward direction.

The filling layer FIL may be disposed on the plurality of lenses LNS. The filling layer FIL may have a predetermined refractive index such that light travels in the third direction DR3 at an interface between the filling layer FIL and the plurality of lenses LNS. Further, the filling layer FIL may be a planarization layer. The filling layer FIL may be an organic layer such as acrylic resin, epoxy resin, phenolic resin, polyamide resin, or polyimide resin.

The cover layer CVL may be disposed on the filling layer FIL. The cover layer CVL may be a glass substrate or a polymer resin. In an embodiment where the cover layer CVL is a glass substrate, the cover layer CVL may be attached onto the filling layer FIL. In such an embodiment, the filling layer FIL may serve to bond the cover layer CVL. In an embodiment where the cover layer CVL is a glass substrate, the cover layer CVL may serve as an encapsulation substrate. In an embodiment where the cover layer CVL is a polymer resin, the cover layer CVL may be directly applied onto the filling layer FIL.

The polarizing plate (not shown) may be disposed on one surface of the cover layer CVL. The polarizing plate may be a structure for preventing visibility degradation caused by reflection of external light. The polarizing plate may include a linear polarizing plate and a phase retardation film. In an embodiment, for example, the phase retardation film may be a λ/4 plate (quarter-wave plate), but the embodiment of the disclosure is not limited thereto. However, in an embodiment where visibility degradation caused by reflection of external light is sufficiently overcome by the first to third color filters CF1, CF2, and CF3, the polarizing plate may be omitted.

Figure 7:
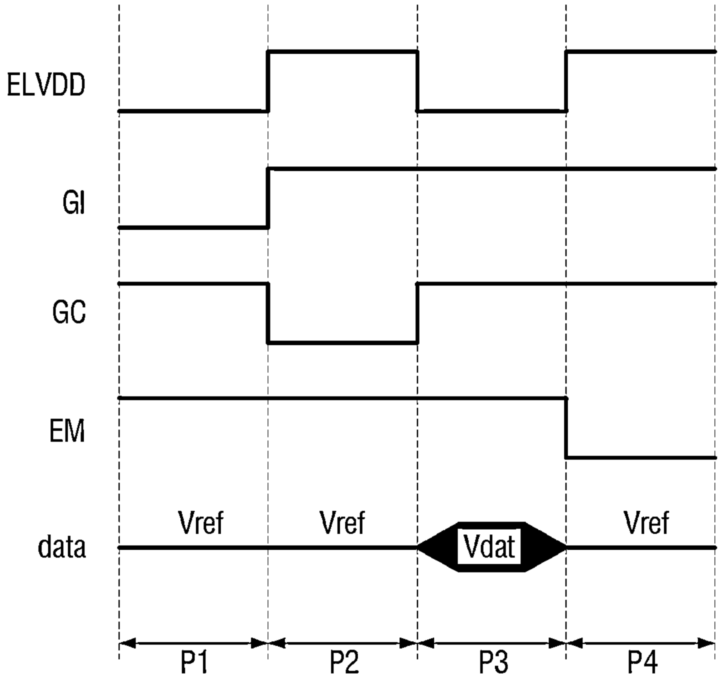
FIG. 7 is a signal timing diagram of the driving voltage signal, the first and second gate signals, the emission control signal, and a data signal of FIG. 4.

FIG. 7 is a signal timing diagram of the driving voltage signal ELVDD, the first and second gate signals GI and GC, the emission control signal EM, and a data signal 'data' of FIG. 4.

In an embodiment, as shown in FIG. 7, the display device 10 may operate based on an initialization period P1, a threshold voltage detection period P2, a data write period P3, and an emission period P4. Here, the threshold voltage detection period P2 may mean a period in which the threshold voltage (Vth) of the first transistor T1 is detected.

The initialization period P1, the threshold voltage detection period P2, the data write period P3, and the emission period P4 may be sequentially and cyclically repeated. In an embodiment, for example, the threshold voltage detection period P2 may proceed after the initialization period P1, the data write period P3 may proceed after the threshold voltage detection period P2, the emission period P4 may proceed after the data write period P3, and the initialization period P1 may proceed again after the emission period P4. After the initialization period P1, the preceding periods may be repeated again.

In an embodiment, the initialization period P1, the threshold voltage detection period P2, and the data write period P3 that are adjacent to each other may correspond to one horizontal period 1H. In other words, one horizontal period 1H may include the initialization period P1, the threshold voltage detection period P2, or the data write period P3. Here, the horizontal period 1H may refer to a period during which pixels (e.g., pixels in one row) arranged in a horizontal direction (e.g., first direction) are driven. Here, the pixels in one row may refer to a plurality of pixels connected to a gate line (e.g., first gate line GIL) in common and respectively connected to a plurality of different data lines DL.

Each of the driving voltage signal ELVDD, the first gate signal GI, the second gate signal GC, and the emission control signal EM may have an active level or a non-active level based on each of the periods P1 to P4 described above. Here, the active level of each signal ELVDD, GI, GC, EM may mean a voltage at a turn-on voltage level of (i.e., a level capable of turning on) a corresponding transistor to which the corresponding signal is applied. In other words, the active level signal may have a value greater than the threshold voltage of the corresponding transistor. In an embodiment, for example, as shown in FIG. 4, where each transistor is a P-type transistor, the active level of each signal may mean a low level (e.g., a negative voltage). In such an embodiment, the non-active level of each signal may mean a voltage at a turn-off voltage level of (i.e., a level capable of turning off) a corresponding transistor. In other words, the non-active level signal may have a smaller value than the threshold voltage of the corresponding transistor. In an embodiment, for example, as shown in FIG. 4, where each transistor is a P-type transistor, the non-active level of each signal may mean a high level (e.g., a positive voltage). In another embodiment, where each transistor is an N-type transistor, the active level of each signal may mean a high level (e.g., a positive voltage), and the non-active level of each signal may mean a low level (e.g., a negative voltage).

The driving voltage signal ELVDD of the active level, the first gate signal GI of the active level, the second gate signal GC of the active level, and the emission control signal EM of the active level may have a same magnitude (or a same voltage level) as each other.

The driving voltage signal ELVDD of the non-active level, the first gate signal GI of the non-active level, the second gate signal GC of the non-active level, and the emission control signal EM of the non-active level may have a same magnitude as each other.

The driving voltage signal ELVDD of the active level may have a magnitude less than a magnitude of the driving voltage signal ELVDD of the non-active level.

The initialization voltage Vref may be lower than or equal to the common voltage ELVSS.

In an embodiment, in the initialization period P1, each of the driving voltage signal ELVDD and the first gate signal GI may have an active level, while each of the second gate signal GC and the emission control signal EM may have a non-active level. In such an embodiment, in the initialization period P1, the data signal 'data' may have a level of the reference voltage Vref. In other words, the data signal 'data' in the initialization period P1 may be the reference voltage Vref. In an embodiment, for example, the reference voltage Vref may be higher than the driving voltage signal ELVDD of the active level (e.g., a negative voltage) and lower than the common voltage ELVSS.

In the threshold voltage detection period P2, the second gate signal GC may have an active level, while each of the driving voltage signal ELVDD, the first gate signal GI, and the emission control signal EM may have a non-active level. In the threshold voltage detection period P2, the data signal 'data' may have a level of the reference voltage Vref.

In the data write period P3, the driving voltage signal ELVDD may have an active level, while each of the first gate signal GI, the second gate signal GC, and the emission control signal EM may have a non-active level. In the data write period P3, the data signal 'data' may have a level of a data voltage Vdat. In other words, the data signal 'data' in the data write period P3 may be the data voltage Vdat having a value corresponding to a specific gray level of an image to be displayed on the screen.

In the emission period P4, the emission control signal EM may have an active level, while each of the driving voltage signal ELVDD, the first gate signal GI, and the second gate signal GC may have a non-active level. In the emission period P4, the data signal 'data' may be maintained at the level of the reference voltage Vref.

The operation of the display device according to an embodiment of the disclosure will be described with reference to FIGS. 7 to 11. In FIGS. 8 to 11, a transistor surrounded by a circular dotted line is a transistor in a turn-on state, and a transistor not surrounded by a circular dotted line is a transistor in a turn-off state.

First, the operation of the display device 10 in the initialization period P1 will be described with reference to FIGS. 7 and 8.

Figure 8:
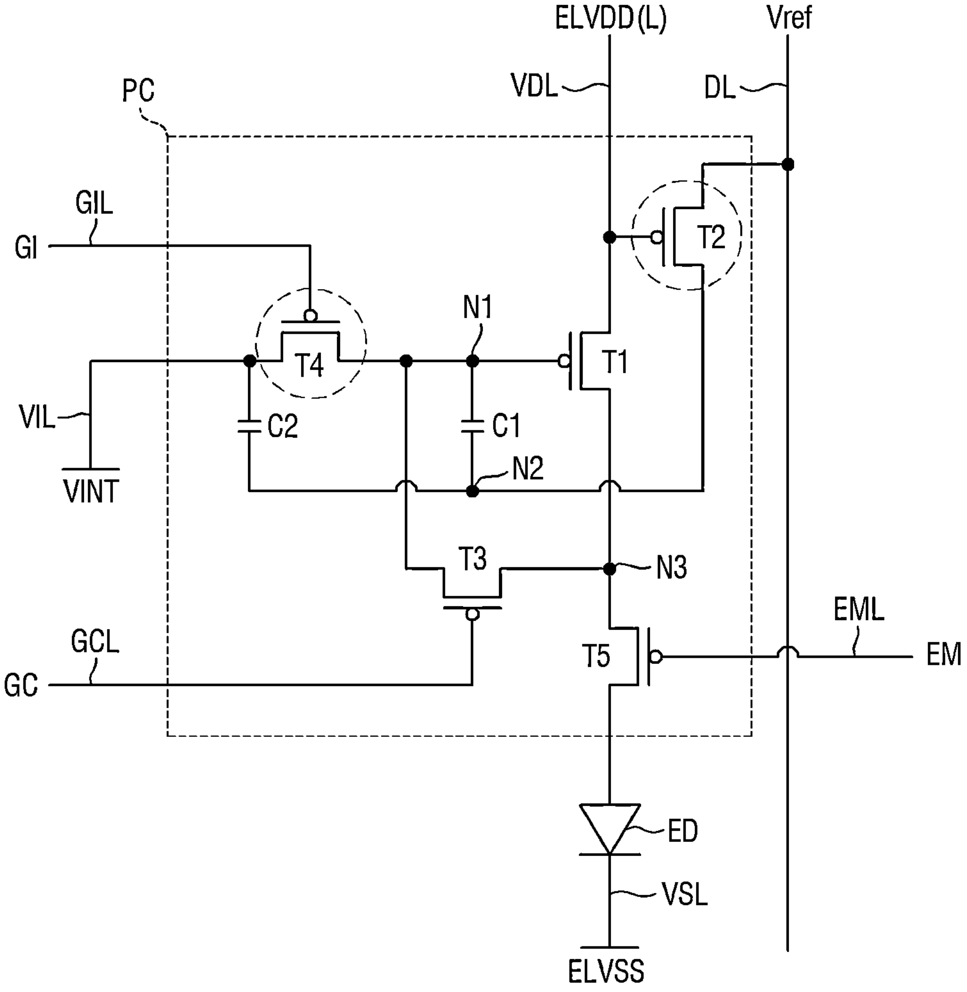
FIG. 8 is a diagram illustrating the operation of the display device of FIG. 4 in the initialization period of FIG. 7.

FIG. 8 is a diagram illustrating the operation of the display device 10 of FIG. 4 in the initialization period P1 of FIG. 7.

As shown in FIG. 7, each of the driving voltage signal ELVDD and the first gate signal GI may have an active level, while each of the second gate signal GC and the emission control signal EM may have a non-active level. In the initialization period P1, the data signal 'data' may have a level of the reference voltage Vref.

As shown in FIG. 8, the first gate signal GI of an active level may be applied to the gate electrode of the fourth transistor T4 through the first gate line GIL. Accordingly, the fourth transistor T4 may be turned on.

As shown in FIG. 8, the driving voltage signal ELVDD of an active level (e.g., a negative voltage L) may be applied to the gate electrode of the second transistor T2 through the driving voltage line VDL. Accordingly, the second transistor T2 may be turned on.

As shown in FIG. 8, the second gate signal GC of the non-active level may be applied to the gate electrode of the third transistor T3 through the second gate line GCL. Accordingly, the third transistor T3 may be turned off.

As shown in FIG. 8, the emission control signal EM of the non-active level may be applied to the gate electrode of the fifth transistor T5 through the emission control line EML. Accordingly, the fifth transistor T5 may be turned off.

As shown in FIG. 8, the initialization voltage VINT from the initialization voltage line VIL may be applied to the first node N1 through the turned-on fourth transistor T4. Accordingly, the first transistor T1 connected to the first node N1 through the gate electrode may be turned off.

As shown in FIG. 8, the driving voltage signal ELVDD of the active level from the driving voltage line VDL may be applied to the source electrode of the first transistor T1.

As shown in FIG. 8, the reference voltage Vref from the data line DL may be applied to the second node N2 through the turned-on second transistor T2.

Accordingly, in the initialization period P1, each of the first node N1, the second node N2, and the source electrode of the first transistor T1 may be initialized.

In the initialization period P1, the voltage of the second node N2 may be kept stable by the initialization voltage VINT that is a direct current voltage and the second capacitor C2 receiving the initialization voltage VINT. Accordingly, the voltage of the drain electrode of the second transistor T2, which is connected to the second node N2, may be kept stable. Accordingly, the data voltage may be stably applied in the data write period.

Next, with reference to FIGS. 6 and 9, the operation of the display device in the threshold voltage detection period P2 will be described as follows.

Figure 9:
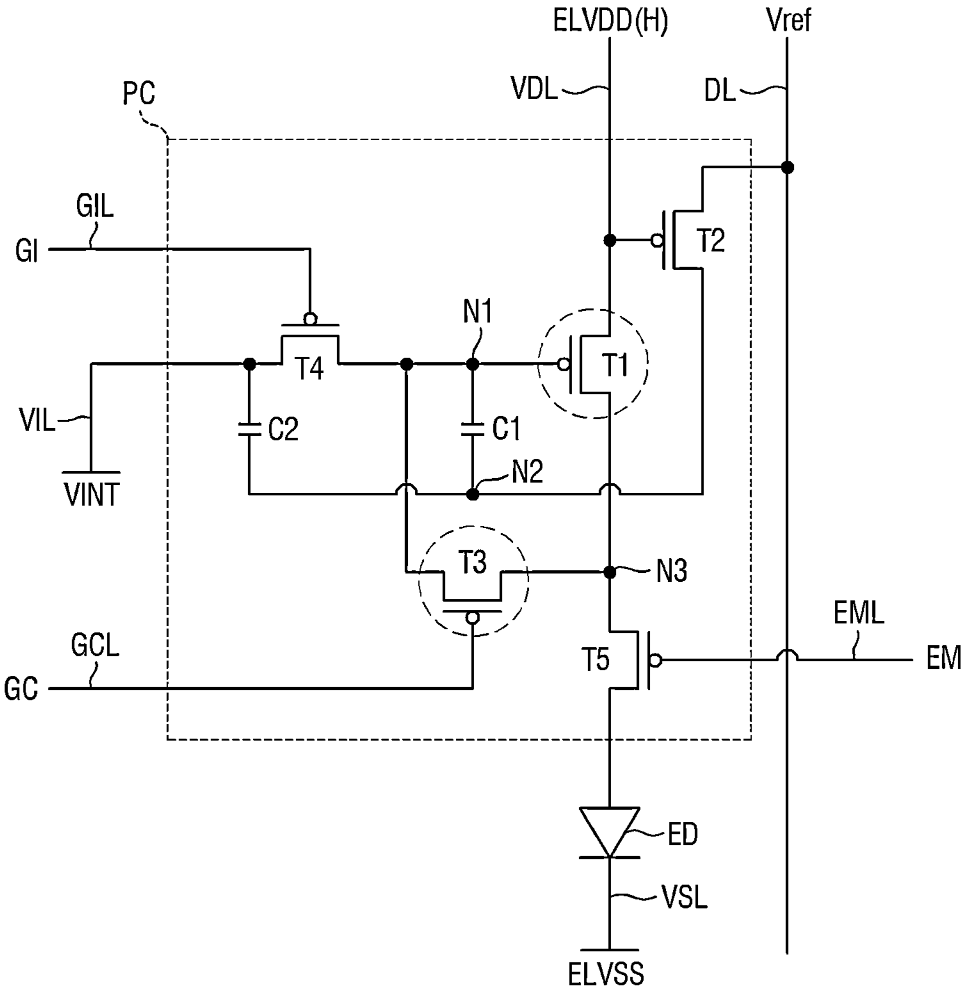
FIG. 9 is a diagram illustrating the operation of the display device of FIG. 4 in the threshold voltage detection period of FIG. 7.

FIG. 9 is a diagram illustrating the operation of the display device 10 of FIG. 4 in the threshold voltage detection period P2 of FIG. 7.

As shown in FIG. 7, in the threshold voltage detection period P2, the second gate signal GC may have an active level, while each of the driving voltage signal ELVDD, the first gate signal GI, and the emission control signal EM may have a non-active level. In the threshold voltage detection period P2, the data signal 'data' may have a level of the reference voltage Vref.

As shown in FIG. 9, the second gate signal GC of the active level may be applied to the gate electrode of the third transistor T3 through the second gate line GCL. Accordingly, the third transistor T3 may be turned on. The initialization voltage VINT of the first node N1 may be applied to the drain electrode of the first transistor T1 through the turned-on third transistor T3. Accordingly, the drain electrode of the first transistor T1 may be initialized.

As shown in FIG. 9, the driving voltage signal ELVDD of a non-active level (e.g., a positive voltage H) may be applied to the gate electrode of the second transistor T2 through the driving voltage line VDL. Accordingly, the second transistor T2 may be turned off.

As shown in FIG. 9, the first gate signal GI of the non-active level may be applied to the gate electrode of the fourth transistor T4 through the first gate line GIL. Accordingly, the fourth transistor T4 may be turned off.

As shown in FIG. 9, the emission control signal EM of the non-active level may be applied to the gate electrode of the fifth transistor T5 through the emission control line EML. Accordingly, the fifth transistor T5 may be turned off.

In the threshold voltage detection period P2, the gate electrode and the drain electrode of the first transistor T1 are connected to each other by the turned-on third transistor T3, so that the first transistor T1 may operate as a diode. In other words, the first transistor T1, which is configured to operate as a diode in the threshold voltage detection period P2, may be turned on by the initialization voltage VINT applied to the gate electrode thereof and the driving voltage signal ELVDD of a non-active level (e.g., a high level) applied to the source electrode thereof. In this case, the initialization voltage VINT applied to the gate electrode of the first transistor T1 may be lower than the driving voltage signal ELVDD of the non-active level (e.g., the positive voltage H) applied to the source electrode of the first transistor T1. Therefore, the P-type first transistor T1 may be turned on. The first capacitor C1 may be charged by the turned-on first transistor T1. Meanwhile, when the first capacitor C1 starts to charge and the voltage across the first capacitor C1 reaches the threshold voltage (Vth) of the first transistor T1, the first transistor T1 is turned off. In other words, as the first capacitor C1 is charged, the voltage of the first node N1, which is one electrode of the first capacitor C1, gradually increases. When the voltage of the first node N1 reaches the sum of the driving voltage signal ELVDD of the non-active level and the threshold voltage of the first transistor T1 (i.e., the driving voltage signal ELVDD of the non-active level+ the threshold voltage (Vth) of the first transistor T1), the first transistor T1 is turned off. Accordingly, the threshold voltage (Vth) of the first transistor T1 may be stored in the first capacitor C1 at the time when the first transistor T1 is turned off.

As such, in the threshold voltage detection period P2, the threshold voltage Vth of the first transistor T1 may be detected, and may be maintained by the first capacitor C1.

Next, the operation of the display device 10 in the data write period P3 will be described with reference to FIGS. 7 and 10.

Figure 10:
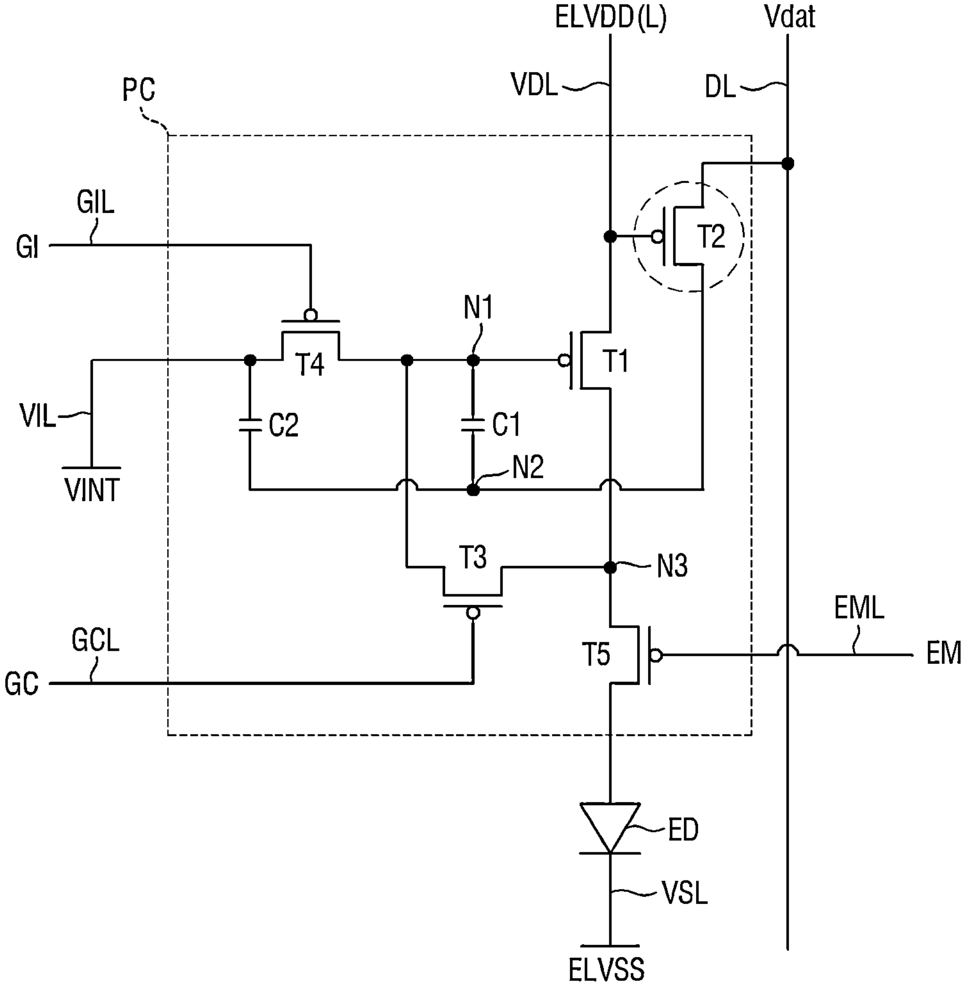
FIG. 10 is a diagram illustrating the operation of the display device of FIG. 4 in the data write period of FIG. 7.

FIG. 10 is a diagram illustrating the operation of the display device 10 of FIG. 4 in the data write period P3 of FIG. 7.

As shown in FIG. 7, in the data write period P3, the driving voltage signal ELVDD may have an active level, while each of the first gate signal GI, the second gate signal GC, and the emission control signal EM may have a non-active level. In the data write period P3, the data signal 'data' may have a level of a data voltage Vdat. In other words, the data signal 'data' in the data write period P3 may be the data voltage Vdat having a value corresponding to a specific gray level of an image to be displayed on the screen.

As shown in FIG. 10, the driving voltage signal ELVDD of an active level may be applied to the gate electrode of the second transistor T2 through the driving voltage line VDL. Accordingly, the second transistor T2 may be turned on.

As shown in FIG. 10, the first gate signal GI of a non-active level may be applied to the gate electrode of the fourth transistor T4 through the first gate line GIL. Accordingly, the fourth transistor T4 may be turned off.

As shown in FIG. 10, the second gate signal GC of a non-active level may be applied to the gate electrode of the third transistor T3 through the second gate line GCL. Accordingly, the third transistor T3 may be turned off.

As shown in FIG. 10, the emission control signal EM of a non-active level may be applied to the gate electrode of the fifth transistor T5 through the emission control line EML. Accordingly, the fifth transistor T5 may be turned off.

As shown in FIG. 10, the data voltage Vdat may be applied to the second node N2 through the data line DL and the turned-on second transistor T2. Here, since the first node N1 is in a floating state, the voltage of the first node N1 may further increase by a voltage (e.g., data voltage Vdat) coupled by the second capacitor C2. Specifically, the magnitude of the data voltage Vdat added to the voltage of the first node N1 may be determined by a ratio between the capacitance of the second capacitor C2 and the capacitance of the first capacitor C1. In an embodiment, for example, the voltage added to the first node N1 may have a value corresponding to "data voltage×(capacitance of C2/(capacitance of C1+capacitance of C2))." In this case, since the data voltage Vdat is divided by the first capacitor C1 and the second capacitor C2, a range (e.g., grayscale expression range) of the data voltage Vdat may be extended. In an embodiment, the capacitance of the first capacitor C1 and the capacitance of the second capacitor C2 may be the same. However, it is not limited thereto, and the capacitance of the first capacitor C1 may be larger than the capacitance of the second capacitor C2. Alternatively, the capacitance of the second capacitor C2 may be larger than the capacitance of the first capacitor C1.

During the data write period P3, a difference voltage (e.g., gate-source voltage) between the first node N1, which is the gate electrode of the first transistor T1, and the source electrode of the first transistor T1 may be maintained by the first capacitor C1. The gate-source voltage may include the threshold voltage (Vth) of the first transistor T1 as well as the data voltage Vdat. In the data write period P3, the voltage of the first node N1 is higher than the driving voltage signal ELVDD of an active level (e.g., the negative voltage L), and thus the first transistor T1 may be turned off.

In this way, during the data write period P3, the voltage of the first node N1, which is the gate electrode of the first transistor T1, may have, for example, a value obtained by adding the data voltage Vdat to the voltage (e.g., threshold voltage of the first transistor T1) of the threshold voltage detection period P2.

Next, the operation of the display device 10 in the emission period P4 will be described with reference to FIGS. 7 and 11.

Figure 11:
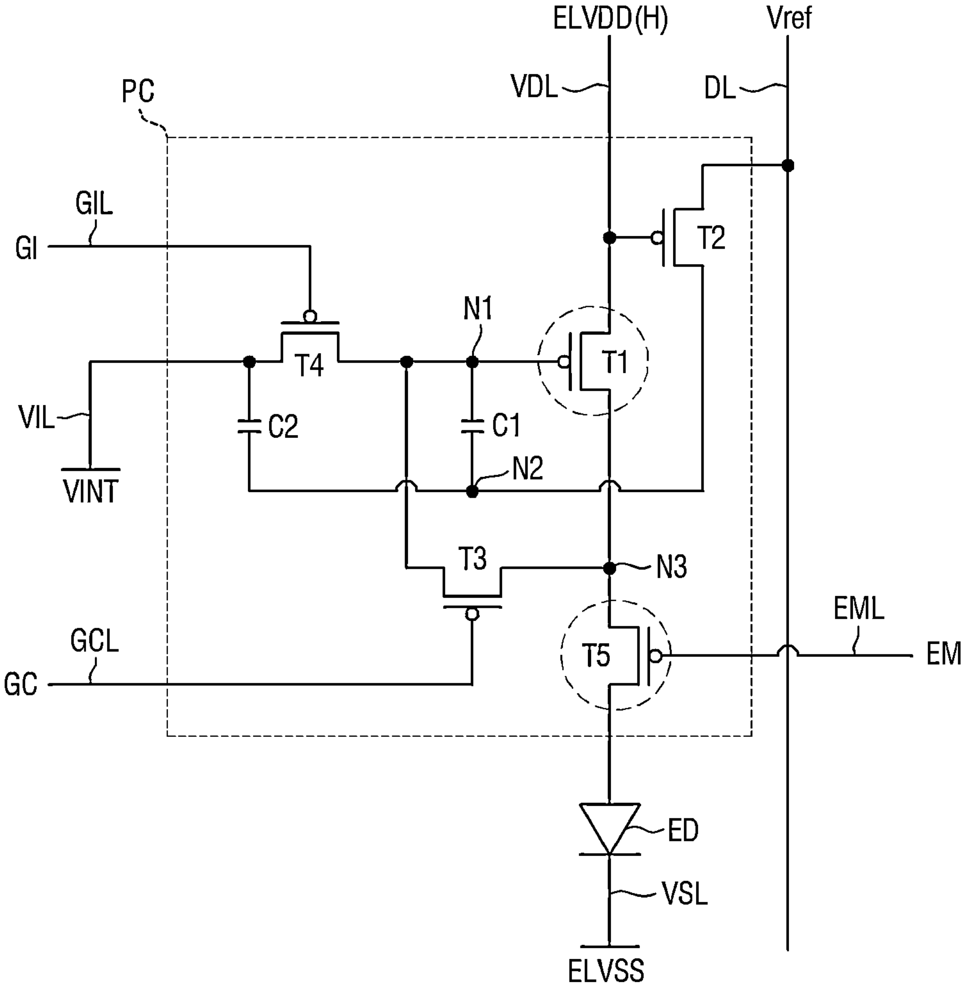
FIG. 11 is a diagram illustrating the operation of the display device of FIG. 4 in the emission period of FIG. 7.

FIG. 11 is a diagram illustrating the operation of the display device 10 of FIG. 4 in the emission period P4 of FIG. 7.

As shown in FIG. 7, in the emission period P4, the emission control signal EM may have an active level, while each of the driving voltage signal ELVDD, the first gate signal GI, and the second gate signal GC may have a non-active level. In the emission period P4, the data signal 'data' may be maintained at the level of the reference voltage Vref.

As shown in FIG. 11, the emission control signal EM of the active level may be applied to the gate electrode of the fifth transistor T5 through the emission control line EML. Accordingly, the fifth transistor T5 may be turned on.

As shown in FIG. 11, the driving voltage signal ELVDD of a non-active level (e.g., the positive voltage H) may be applied to the source electrode of the first transistor T1 and the gate electrode of the second transistor T1 through the driving voltage line VDL. Accordingly, the first transistor T1 may be turned on and the second transistor T2 may be turned off.

As shown in FIG. 11, the first gate signal GI of the non-active level may be applied to the gate electrode of the fourth transistor T4 through the first gate line GIL. Accordingly, the fourth transistor T4 may be turned off.

As shown in FIG. 10, the second gate signal GC of a non-active level may be applied to the gate electrode of the third transistor T3 through the second gate line GCL. Accordingly, the third transistor T3 may be turned off.

Meanwhile, in the emission period P4, the first transistor T1 may be maintained in a turn-on state by the gate-source voltage maintained by the first capacitor C1.

As such, in the emission period P4, as the first transistor T1 and the fifth transistor T5 are turned on, the driving voltage ELVDD of a non-active level (e.g., the positive voltage H) may be applied to the first electrode (e.g., N3) of the light emitting element ED through the turned-on first transistor T1 and fifth transistor T5. At this time, since the gate-source voltage maintained by the first capacitor C1 includes the threshold voltage Vth of the first transistor T1, the magnitude of the driving current flowing to the light emitting element ED through the turned-on first transistor T1 may be determined based on the data voltage Vdat and the threshold voltage Vth of the first transistor T1. Accordingly, the driving current supplied to the light emitting element ED may accurately reflect the magnitude of the data voltage Vdat. In other words, the aforementioned driving current may have an accurate value in which the threshold voltage (Vth) of the first transistor T1 is compensated. As such, since the threshold voltage Vth of the first transistor T1 of each pixel PX is compensated to determine the driving current of each pixel, luminance deviation between the pixels PX depending on a deviation of the threshold voltage Vth between the first transistors T1 of the pixels PX may be minimized. Accordingly, the image quality of the display device may be improved.

According to the display device of an embodiment, the driving voltage signal ELVDD may be applied in an alternating current manner (e.g., an active level and a non-active level). Accordingly, turn-on and turn-off of the second transistor T2 may be controlled through the driving voltage signal ELVDD. Accordingly, a separate gate line is not used to control the turn-on and turn-off of the second transistor T2. Therefore, the number of gate lines used to drive the display device 10 may be reduced.

In such an embodiment, since the threshold voltage detection period P2 and the data write period P3 are separated, the data voltage Vdat may be written at high speed. Accordingly, high-speed driving of the display device 10 is possible.

Figure 12:
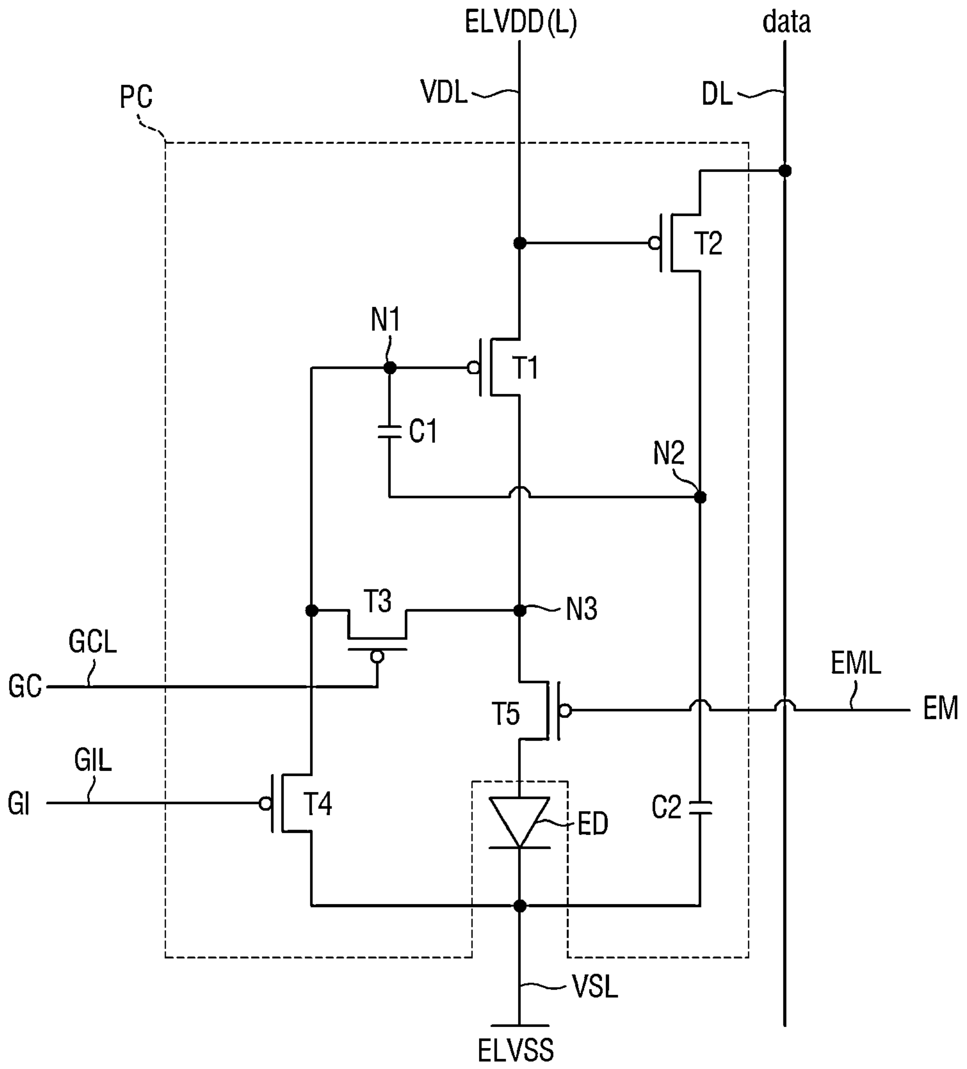
FIG. 12 is an equivalent circuit diagram of the pixel according to an embodiment.

FIG. 12 is an equivalent circuit diagram of the pixel PX according to an embodiment.

The pixel PX of FIG. 12 is substantially the same as the pixel PX of FIG. 4 described above except for the connection relationship between the fourth transistor T4 and the second capacitor C2. This difference will be mainly described as follows.

The fourth transistor T4 of FIG. 12 may be turned on by the first gate signal GI from the first gate line GIL to electrically connect the first node N1 to the common voltage line VSL. The gate electrode of the fourth transistor T4 may be electrically connected to the first gate line GIL, the source electrode thereof may be electrically connected to the first node N1, and the drain electrode thereof may be electrically connected to the common voltage line VSL.

The second capacitor C2 of FIG. 12 may be electrically connected between the common voltage line VSL and the second node N2. In an embodiment, for example, the first electrode of the second capacitor C2 may be electrically connected to the common voltage line VSL, and the second electrode of the second capacitor C2 may be electrically connected to the second node N2.

In such an embodiment, the driving voltage signal ELVDD applied to the driving voltage line VDL, the first gate signal GI applied to the first gate line GIL, the second gate signal GC applied to the second gate line GCL, the emission control signal EM applied to the emission control line EML, and the data signal 'data' applied to the data line DL of FIG. 12 may be the same as the driving voltage signal ELVDD, the first gate signal GI, the second gate signal GC, the emission control signal EM, and the data signal 'data' of FIG. 7 described above. In other words, the pixel PX of FIG. 12 may operate based on the driving voltage signal ELVDD, the first gate signal GI, the second gate signal GC, the emission control signal EM, and the data signal 'data' of FIG. 7 described above.

The operation of the display device 10 according to an embodiment will be described with reference to FIG. 7 and FIGS. 13 to 16 as follows. In FIGS. 13 to 16, a transistor surrounded by a circular dotted line is a transistor in a turn-on state, and a transistor not surrounded by a circular dotted line is a transistor in a turn-off state.

First, the operation of the display device 10 in the initialization period P1 will be described with reference to FIGS. 7 and 13 as follows.

Figure 13:
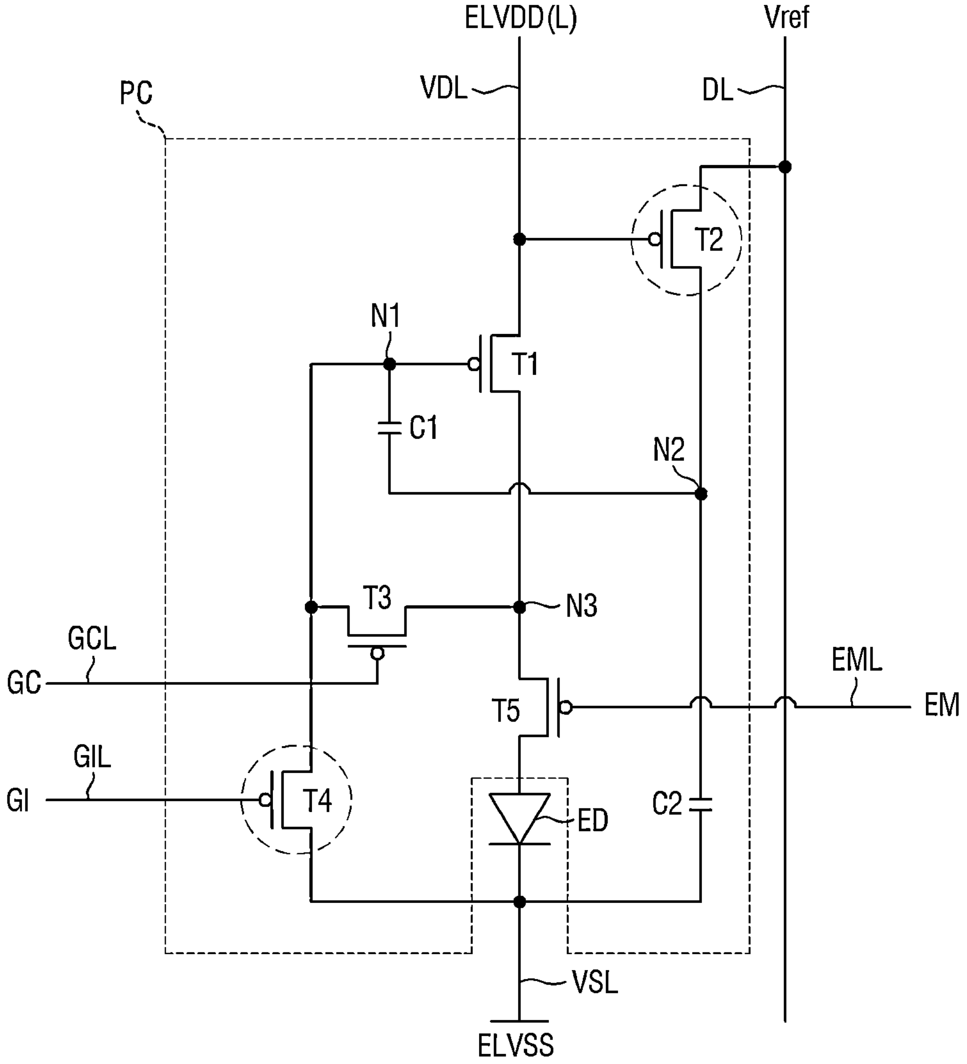
FIG. 13 is a diagram illustrating the operation of the display device of FIG. 12 in the initialization period of FIG. 7.

FIG. 13 is a diagram illustrating the operation of the display device 10 of FIG. 12 in the initialization period P1 of FIG. 7.

The operation of the pixel of FIG. 13 in the initialization period P1 is substantially the same as the operation of the pixel PX of FIG. 8 in the initialization period P1 described above. Accordingly, in an embodiment, as shown in FIG. 13, the common voltage ELVSS may be applied to the first node N1 through the turned-on fourth transistor T4, instead of the initialization voltage VINT. In other words, as shown in FIG. 13, the common voltage ELVSS from the common voltage line VSL may be applied to the first node N1 through the turned-on fourth transistor T4.

Next, the operation of the display device in the threshold voltage detection period P2 will be described with reference to FIGS. 7 and 14 as follows.

Figure 14:
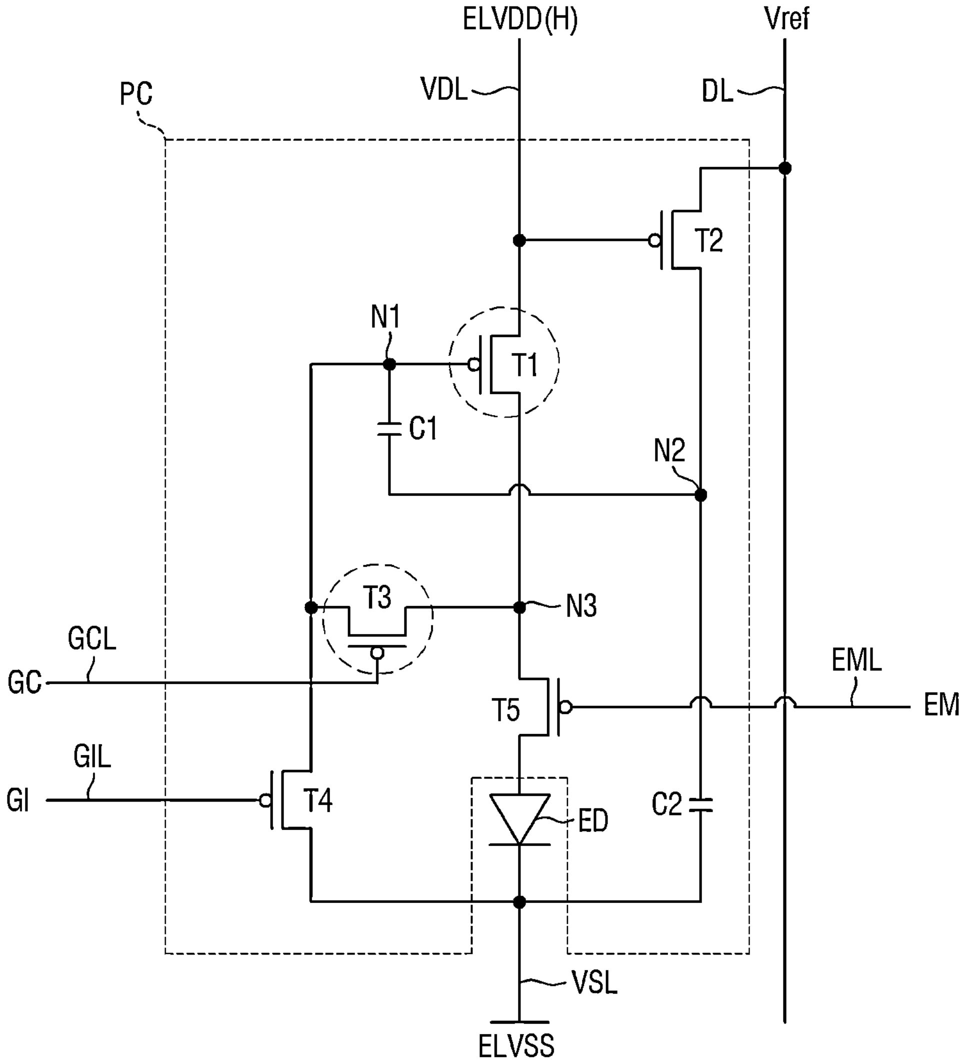
FIG. 14 is a diagram illustrating the operation of the display device of FIG. 12 in the threshold voltage detection period of FIG. 7.

FIG. 14 is a diagram illustrating the operation of the display device 10 of FIG. 12 in the threshold voltage detection period P2 of FIG. 7.

The operation of the pixel of FIG. 14 in the threshold voltage detection period P2 is substantially the same as the operation of the pixel PX of FIG. 9 in the threshold voltage detection period P2 described above. Accordingly, in an embodiment, as shown in FIG. 14, the common voltage ELVSS is applied to the first node N1 instead of the initialization voltage VINT.

Next, the operation of the display device 10 in the data write period P3 will be described with reference to FIGS. 7 and 15 as follows.

Figure 15:
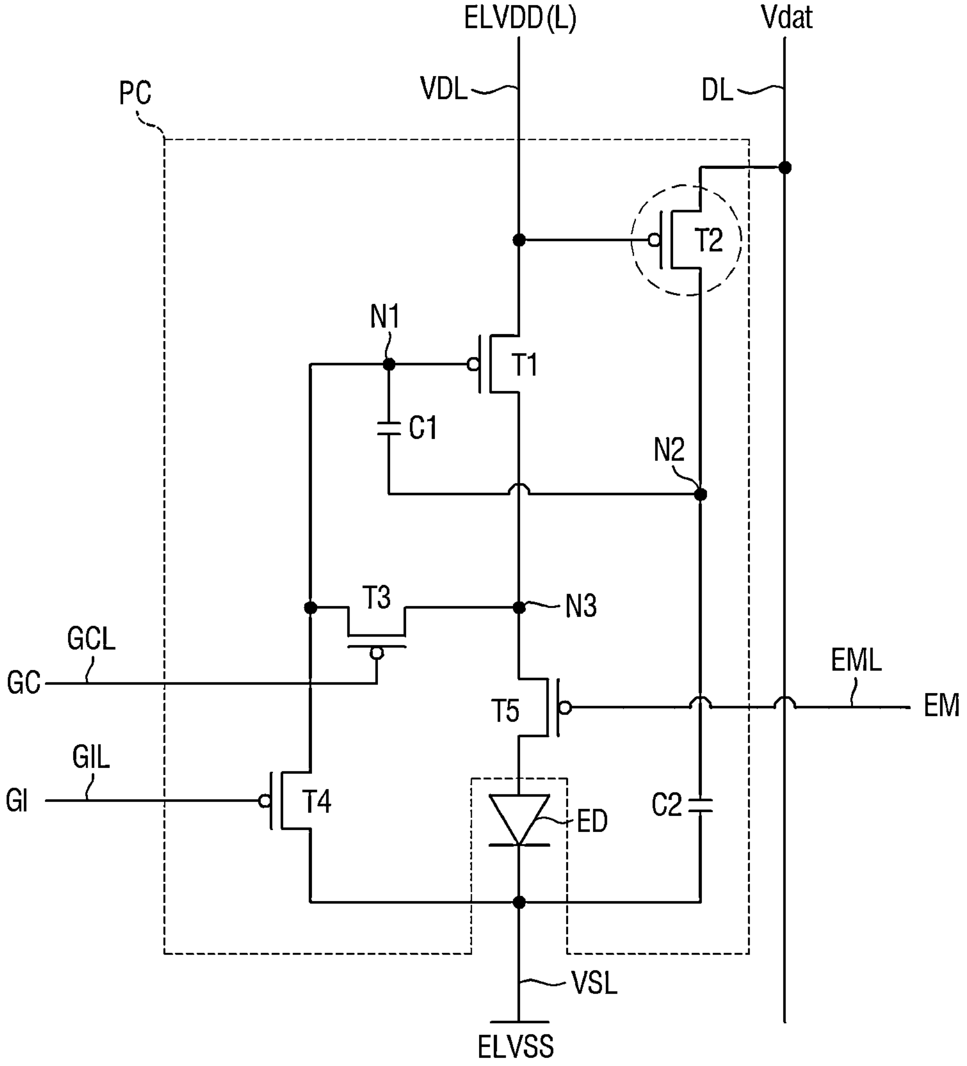
FIG. 15 is a diagram illustrating the operation of the display device of FIG. 12 in the data write period of FIG. 7.

FIG. 15 is a diagram illustrating the operation of the display device 10 of FIG. 12 in the data write period P3 of FIG. 7.

The operation of the pixel PX of FIG. 15 in the data write period P3 is substantially the same as the operation of the pixel PX of FIG. 10 in the data write period P3 described above. Accordingly, in an embodiment, as shown in FIG. 15, the common voltage ELVSS is applied to the first node N1 instead of the initialization voltage VINT.

Next, the operation of the display device 10 in the emission period P4 will be described with reference to FIGS. 7 and 16 as follows.

Figure 16:
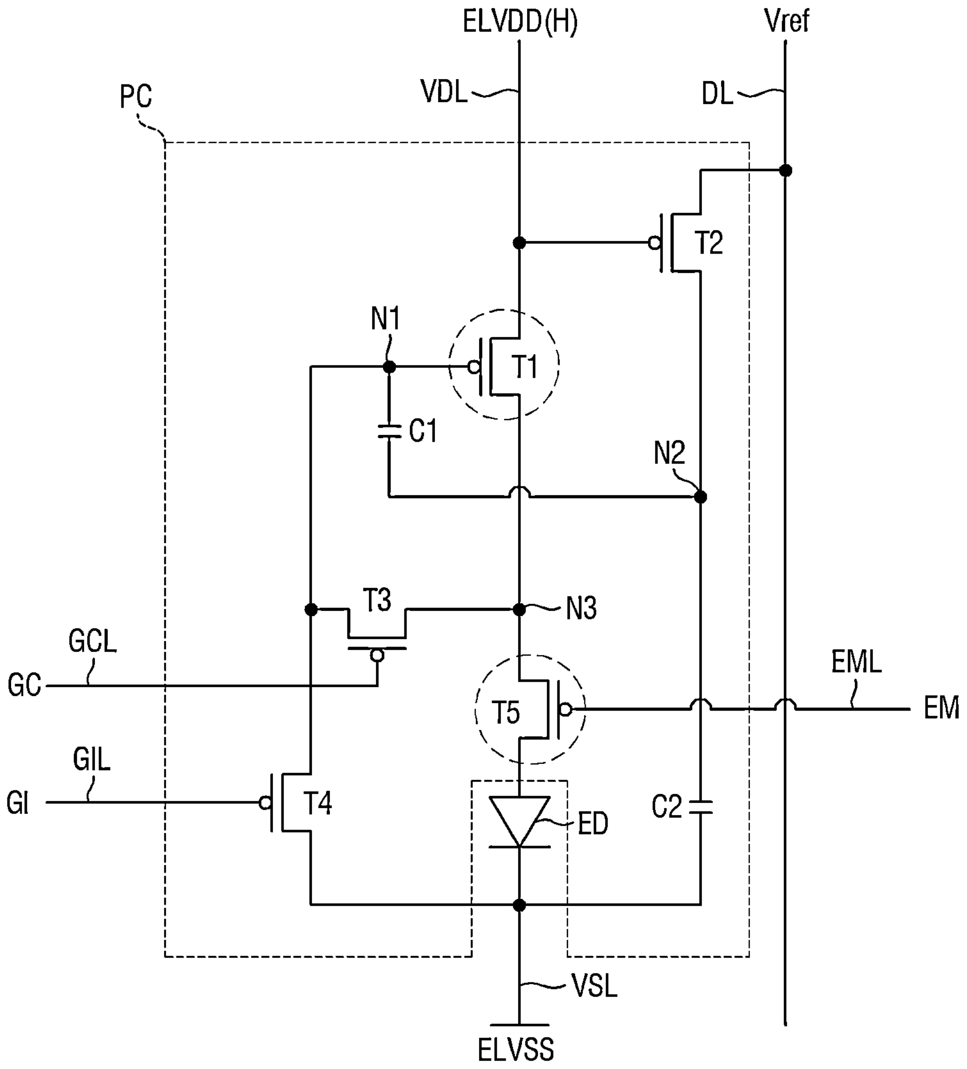
FIG. 16 is a diagram illustrating the operation of the display device of FIG. 12 in the emission period of FIG. 7.

FIG. 16 is a diagram illustrating the operation of the display device 10 of FIG. 12 in the emission period P4 of FIG. 7.

The operation of the pixel of FIG. 16 in the emission period is substantially the same as the operation of the pixel of FIG. 11 in the emission period described above. Accordingly, in an embodiment, as shown in FIG. 16, the common voltage ELVSS is applied to the first node N1 instead of the initialization voltage VINT.

Figure 17:
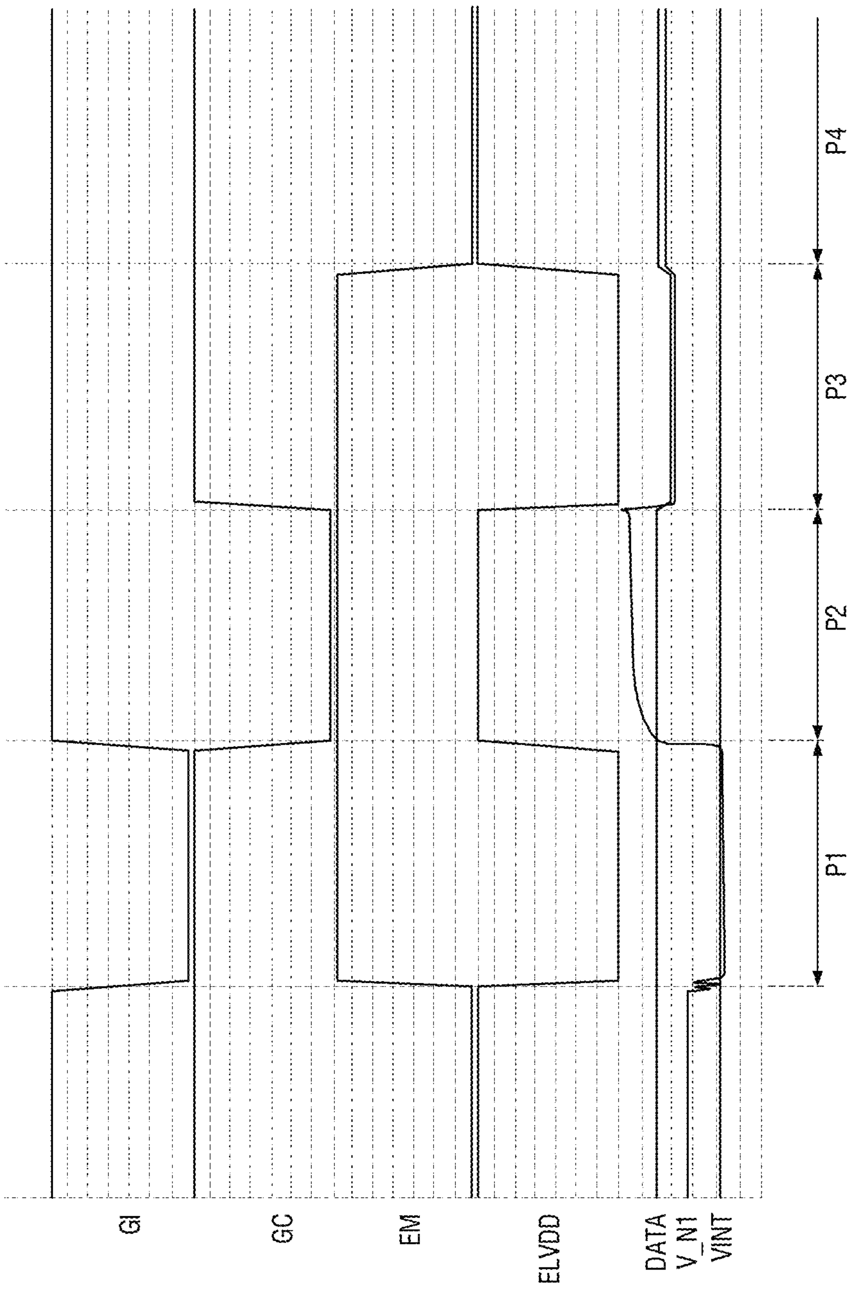
FIG. 17 is a diagram illustrating simulation signals corresponding to the signals of FIG. 7.

FIG. 17 is a diagram illustrating simulation signals corresponding to the signals of FIG. 7.

FIG. 17 illustrates simulation waveforms of the first gate signal GI, the second gate signal GC, the emission control signal EM, the driving voltage signal ELVDD, and the data signal 'data' shown in FIG. 7 in each of the periods P1 to P4.

Additionally, FIG. 17 illustrates waveforms of a first node voltage V_N1 and the initialization voltage VINT in each of the periods P1 to P4.

Figure 18:
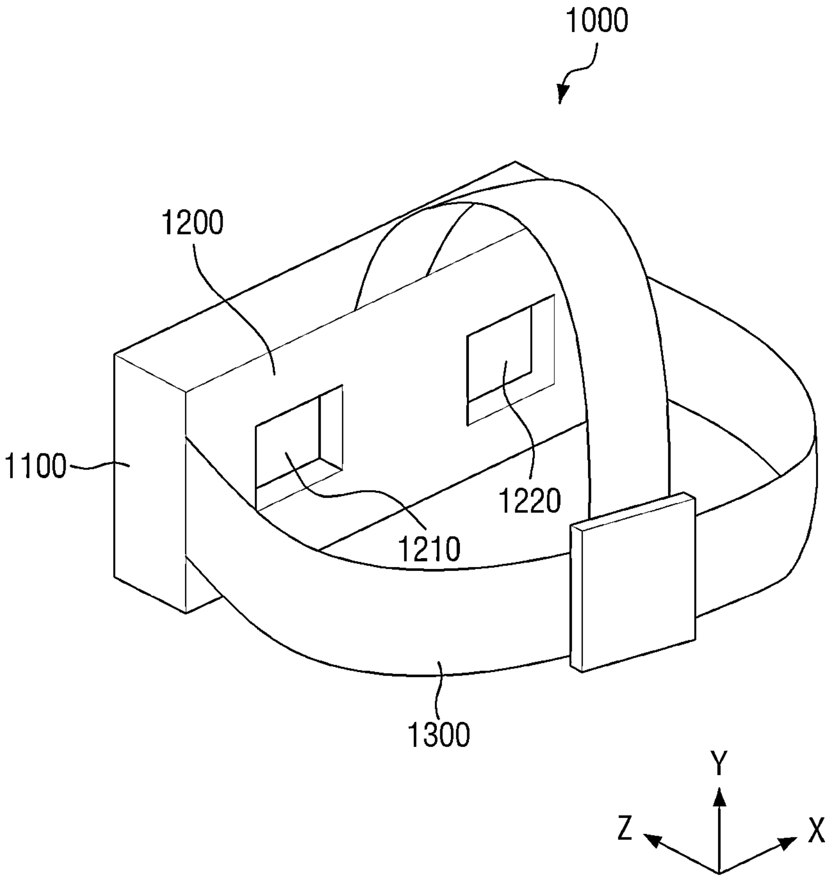
FIG. 18 is a perspective view illustrating a head mounted display device according to an embodiment.
Figure 19:
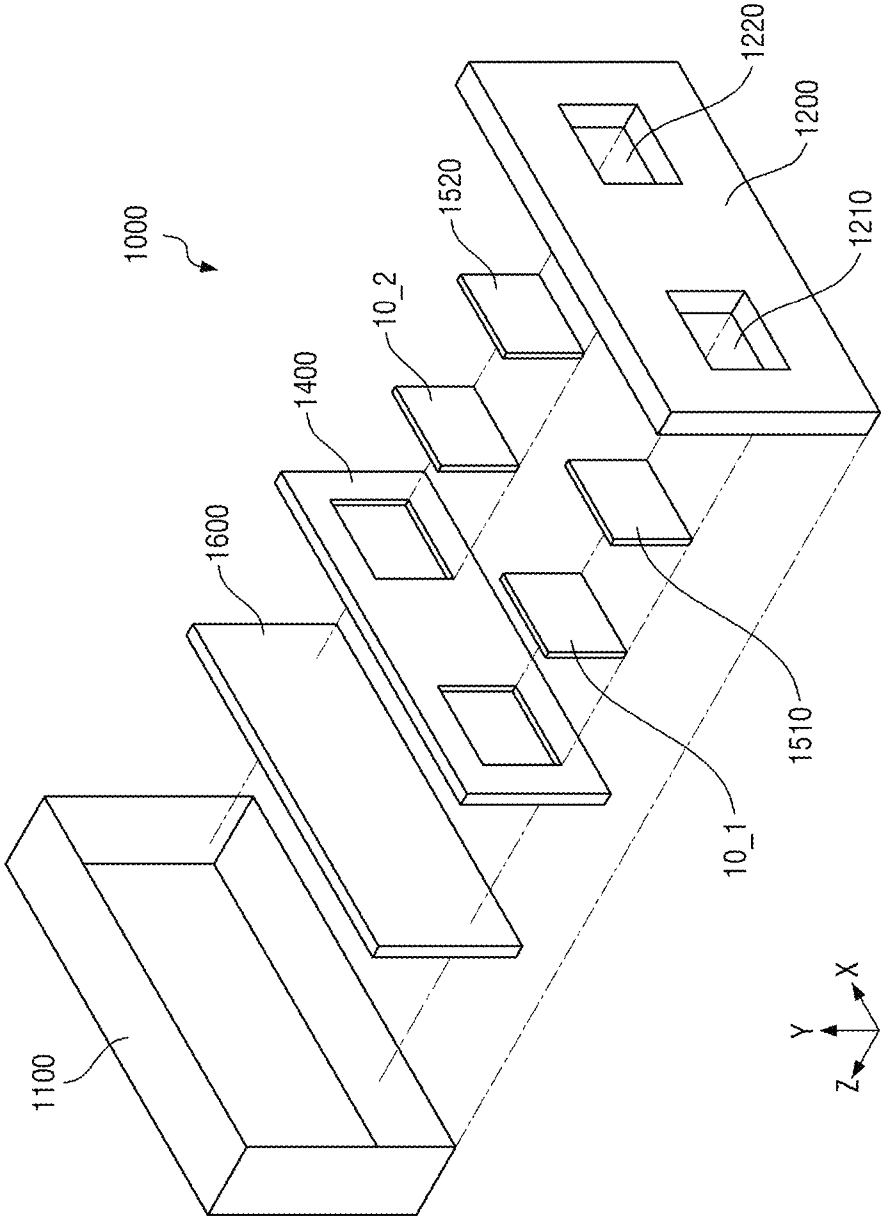
FIG. 19 is an exploded perspective view illustrating an embodiment of the head mounted display device of FIG. 18.

FIG. 18 is a perspective view illustrating a head mounted display device according to an embodiment. FIG. 19 is an exploded perspective view illustrating an embodiment of the head mounted display device of FIG. 18.

Referring to FIGS. 18 and 19, a head mounted display device 1000 as an optical device according to an embodiment includes a first display device 10_1, a second display device 10_2, a display device housing 1100, a housing cover 1200, optical path conversion members 1210, 1220, 1510, and 1520, a head mounted band 1300, a middle frame 1400, a control circuit board 1600, and a connector 1610.

The optical path conversion member may include a first eyepiece 1210, a second eyepiece 1220, a first optical member 1510, and a second optical member 1520.

The first display device 10_1 provides an image to the user's left eye, and the second display device 10_2 provides an image to the user's right eye. Since each of the first display device 10_1 and the second display device 10_2 is substantially the same as the display device 10 described in conjunction with FIGS. 1 to 6, any repetitive detailed description of the first display device 10_1 and the second display device 10_2 will be omitted.

The first optical member 1510 may be disposed between the first display device 10_1 and the first eyepiece 1210. The second optical member 1520 may be disposed between the second display device 10_2 and the second eyepiece 1220. Each of the first optical member 1510 and the second optical member 1520 may include at least one convex lens.

The middle frame 1400 may be disposed between the first display device 10_1 and the control circuit board 1600 and between the second display device 10_2 and the control circuit board 1600. The middle frame 1400 serves to support and fix the first display device 10_1, the second display device 10_2, and the control circuit board 1600.

The control circuit board 1600 may be disposed between the middle frame 1400 and the display device housing 1100. The control circuit board 1600 may be connected to the first display device 10_1 and the second display device 10_2 through the connector 1610. The control circuit board 1600 may convert an image source input from the outside into digital video data DATA, and transmit the digital video data DATA to the first display device 10_1 and the second display device 10_2 through the connector 1610.

The control circuit board 1600 may transmit the digital video data corresponding to a left-eye image optimized for the user's left eye to the first display device 10_1, and may transmit the digital video data DATA corresponding to a right-eye image optimized for the user's right eye to the second display device 10_2. Alternatively, the control circuit board 1600 may transmit the same digital video data DATA to the first display device 10_1 and the second display device 10_2.

The display device housing 1100 serves to accommodate the first display device 10_1, the second display device 10_2, the middle frame 1400, the first optical member 1510, the second optical member 1520, the control circuit board 1600, and the connector 1610. The housing cover 1200 is disposed to cover one open surface of the display device housing 1100. The housing cover 1200 may include the first eyepiece 1210 at which the user's left eye is disposed and the second eyepiece 1220 at which the user's right eye is disposed. FIGS. 18 and 19 illustrate an embodiment where the first eyepiece 1210 and the second eyepiece 1220 are disposed separately, but the embodiment of the disclosure is not limited thereto. In an embodiment, for example, the first eyepiece 1210 and the second eyepiece 1220 may be combined into one.

The first eyepiece 1210 may be aligned with the first display device 10_1 and the first optical member 1510, and the second eyepiece 1220 may be aligned with the second display device 10_2 and the second optical member 1520. Therefore, the user may view, through the first eyepiece 1210, the image of the first display device 10_1 magnified as a virtual image by the first optical member 1510, and may view, through the second eyepiece 1220, the image of the second display device 10_2 magnified as a virtual image by the second optical member 1520.

The head mounted band 1300 serves to secure the display device housing 1100 to the user's head such that the first eyepiece 1210 and the second eyepiece 1220 of the housing cover 1200 remain disposed on the user's left and right eyes, respectively. In an embodiment where the display device housing 1200 is desired to be implemented to be lightweight and compact, the head mounted display device 1000 may be provided with, as shown in FIG. 20, an eyeglass frame instead of a head mounted band 800.

In addition, the head mounted display device 1000 may further include a battery for supplying power, an external memory slot for accommodating an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a Wi-Fi module, or a Bluetooth module.

Figure 20:
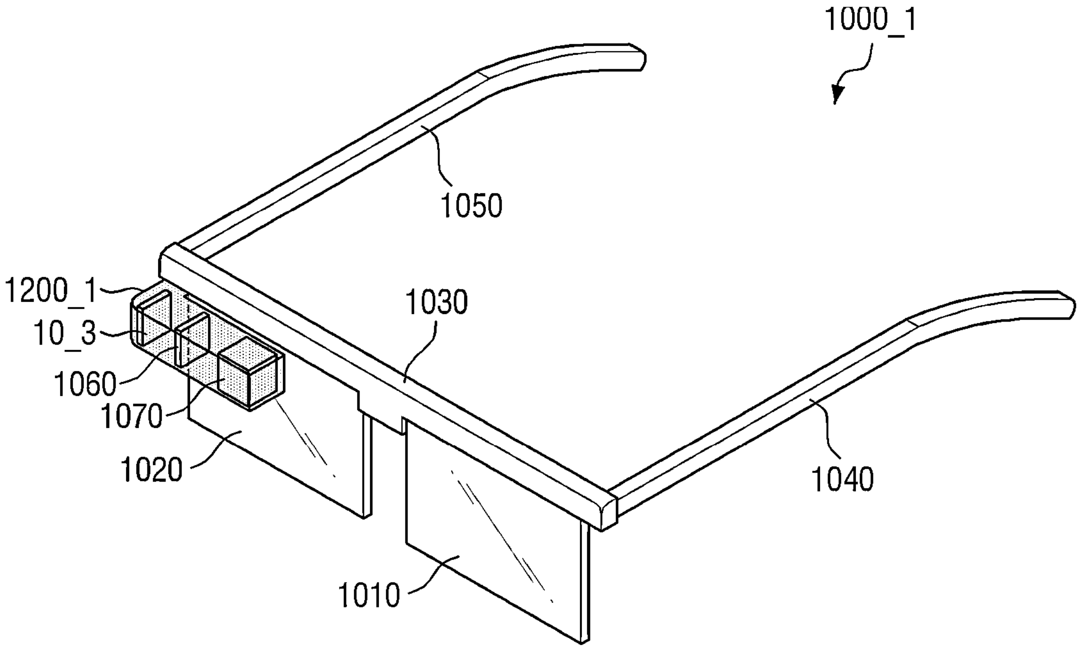
FIG. 20 is a perspective view illustrating a head mounted display device according to an embodiment.

FIG. 20 is a perspective view illustrating a head mounted display device according to an embodiment.

Referring to FIG. 20, a head mounted display device 1000_1 according to an embodiment may be an eyeglasses-type display device in which a display device housing 1200_1 is implemented in a lightweight and compact manner. The head mounted display device 1000_1 according to an embodiment may include a display device 10_3, a left eye lens 1010, a right eye lens 1020, a support frame 1030, temples 1040 and 1050, an optical member 1060, an optical path conversion member 1070, and the display device housing 1200_1.

The display device housing 1200_1 may include the display device 10_3, the optical member 1060, and the optical path conversion member 1070. The image displayed on the display device 10_3 may be magnified by the optical member 1060, and may be provided to the user's right eye through the right eye lens 1020 after the optical path thereof is converted by the optical path conversion member 1070. As a result, the user may view an augmented reality image, through the right eye, in which a virtual image displayed on the display device 10_3 and a real image seen through the right eye lens 1020 are combined.

FIG. 20 illustrates an embodiment where the display device housing 1200_1 is disposed at the end on the right side of the support frame 1030, but the embodiment of the disclosure is not limited thereto. In an embodiment, for example, the display device housing 1200_1 may be disposed on the left end of the support frame 1030, and in this case, the image of the display device 10_3 may be provided to the user's left eye. Alternatively, the display device housing 1200_1 may be disposed on both the left and right ends of the support frame 1030, and in this case, the user may view the image displayed on the display device 10_3 through both the left and right eyes.

The invention should not be construed as being limited to the embodiments set forth herein. Rather, these embodiments are provided so that this disclosure will be thorough and complete and will fully convey the concept of the invention to those skilled in the art. While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a light emitting element;

a driving voltage line which transmits a driving voltage signal having an active level or a non-active level in a preset period;

a data line to which a data signal is applied;

a first transistor connected between the driving voltage line and the light emitting element; and a second transistor connected to the driving voltage line and the data line, wherein a gate electrode of the second transistor is connected to the driving voltage line, and a source electrode of the second transistor is connected to the data line.

2. The display device of claim 1, wherein a gate electrode of the first transistor is connected to a first node, a source electrode of the first transistor is connected to the driving voltage line, and a drain electrode of the first transistor is connected to a first electrode of the light emitting element through a third node, and a second electrode of the second transistor is connected to a second node.

3. The display device of claim 2, further comprising:

a third transistor comprising a gate electrode connected to a second gate line to which a second gate signal is applied, a source electrode connected to the third node, and a drain electrode connected to the first node;

a fourth transistor comprising a gate electrode connected to a first gate line to which a first gate signal is applied, a source electrode connected to the first node, and a drain electrode connected to an initialization voltage line;

a fifth transistor comprising a gate electrode connected to an emission control line to which an emission control signal is applied, a source electrode connected to the third node, and a drain electrode connected to the first electrode of the light emitting element;

a first capacitor connected between the first node and the second node; and a second capacitor connected between the initialization voltage line and the second node.

4. The display device of claim 3, wherein the preset period comprises an initialization period, a threshold voltage detection period, a data write period, and an emission period.

5. The display device of claim 4, wherein in the initialization period, each of the driving voltage signal and the first gate signal has an active level, each of the second gate signal and the emission control signal has a non-active level, and the data signal has a level of a reference voltage.

6. The display device of claim 5, wherein the driving voltage signal of the active level, the first gate signal of the active level, the second gate signal of the active level, and the emission control signal of the active level have a same magnitude as each other.

7. The display device of claim 5, wherein the driving voltage signal of the non-active level, the first gate signal of the non-active level, the second gate signal of the non-active level, and the emission control signal of the non-active level have a same magnitude as each other.

8. The display device of claim 5, further comprising:

a common voltage line connected to the second electrode of the light emitting element, wherein the common voltage line transmits a common voltage.

9. The display device of claim 8, wherein the reference voltage is higher than the driving voltage signal of the non-active level and lower than the common voltage.

10. The display device of claim 8, wherein the initialization voltage line transmits an initialization voltage, and the initialization voltage is lower than or equal to the common voltage.

11. The display device of claim 5, wherein each of the driving voltage signal of the active level, the first gate signal of the active level, the second gate signal of the active level, and the emission control signal of the active level is a negative voltage, and each of the driving voltage signal of the non-active level, the first gate signal of the non-active level, the second gate signal of the non-active level, and the emission control signal of the non-active level is a positive voltage.

12. The display device of claim 4, wherein in the threshold voltage detection period, the second gate signal has an active level, each of the driving voltage signal, the first gate signal, and the emission control signal has a non-active level, and the data signal has a level of a reference voltage.

13. The display device of claim 4, wherein in the data write period, the driving voltage signal has an active level, each of the first gate signal, the second gate signal, and the emission control signal has a non-active level, and the data signal has a level of a data voltage.

14. The display device of claim 4, wherein in the emission period, the emission control signal has an active level, each of the driving voltage signal, the first gate signal, and the second gate signal has a non-active level, and the data signal has a level of a reference voltage.

15. The display device of claim 3, wherein the first capacitor and the second capacitor have a same capacitance as each other.

16. The display device of claim 15, wherein the driving voltage signal of the active level has a magnitude less than a magnitude of the driving voltage signal of the non-active level.

17. The display device of claim 16, wherein the driving voltage signal of the active level is a positive voltage, and the driving voltage signal of the non-active level is a negative voltage.

18. The display device of claim 3, wherein each of the first to fifth transistors is a P-type metal-oxide-semiconductor field effect transistor (MOSFET).

19. The display device of claim 2, further comprising:

a third transistor comprising a gate electrode connected to a second gate line to which a second gate signal is applied, a source electrode connected to the third node, and a drain electrode connected to the first node;

a fourth transistor comprising a gate electrode connected to a first gate line to which a first gate signal is applied, a source electrode connected to the first node, and a drain electrode connected to a common voltage line;

a fifth transistor comprising a gate electrode connected to an emission control line to which an emission control signal is applied, a source electrode connected to the third node, and a drain electrode connected to the first electrode of the light emitting element;

a first capacitor connected between the first node and the second node; and a second capacitor connected between the common voltage line and the second node.

20. The display device of claim 1, wherein the driving voltage signal of the active level has a magnitude corresponding to a turn-on voltage of the second transistor.

21. The display device of claim 1, wherein the driving voltage signal of the non-active level has a magnitude corresponding to a turn-off voltage of the second transistor.

* * * * *